United States Patent [19]

Yoshida et al.

[11] Patent Number: 5,680,158

[45] Date of Patent: Oct. 21, 1997

[54] COMMUNICATION APPARATUS INCLUDING A PLURALITY OF LIGHT SOURCES ARRANGED IN COLUMNS AND LINES CORRESPONDING TO COLUMNS AND LINES OF A PLURALITY OF KEY SWITCHES

[75] Inventors: Masaaki Yoshida, Tokyo; Isamu Shimoda, Zama; Mikiharu Matsuoka, Tokyo; Yasuko Miyazaki; Masaaki Kanashiki, both of Yokohama, all of Japan

[73] Assignee: Canon Kabushiki Kaisha, Tokyo, Japan

[21] Appl. No.: 944,079

[22] Filed: Sep. 11, 1992

[30] Foreign Application Priority Data

Sep. 11, 1991 [JP] Japan .................... 3-259770

[51] Int. Cl.$^6$ .................... G09G 5/00; G09G 3/20; H04Q 3/00; B41J 5/00
[52] U.S. Cl. .................... 345/168; 340/825.19; 341/21; 345/55; 395/793; 400/87
[58] Field of Search .................... 364/419, 419.01, 364/419.02, 419.03, 419.1, 419.14, 709.01, 709.02, 709.09, 709.11, 709.15, 710.01, 710.12, 419.16; 434/112; 395/144, 145, 148, 150, 155, 161, 751, 752, 753, 792, 793, 796, 797, 798; 345/55, 160; 340/825.19; 341/21; 400/87

[56] References Cited

U.S. PATENT DOCUMENTS

| | | | |
|---|---|---|---|
| 4,075,621 | 2/1978 | Salmon | 340/337 |
| 4,215,240 | 7/1980 | Ostrowski | 179/1 |
| 4,289,411 | 9/1981 | Cornelius et al. | 347/5 |
| 4,374,425 | 2/1983 | Fuka | 364/709.15 |
| 4,428,065 | 1/1984 | Duvall et al. | 395/150 |
| 4,503,426 | 3/1985 | Mikulski | 340/711 |
| 4,788,649 | 11/1988 | Shea et al. | 364/513.5 |
| 4,922,448 | 5/1990 | Kunieda et al. | 395/750 |
| 5,008,847 | 4/1991 | Lapeyre | 364/709.16 |
| 5,030,101 | 7/1991 | Ikemoto et al. | 434/157 |
| 5,154,614 | 10/1992 | Matsuoka et al. | 434/112 |

FOREIGN PATENT DOCUMENTS 2749334 5/1978 Germany .................... G06F 3/14

*Primary Examiner*—Gail O. Hayes
*Assistant Examiner*—Stephen R. Tkacs
*Attorney, Agent, or Firm*—Fitzpatrick, Cella, Harper & Scinto

[57] ABSTRACT

A communication apparatus for a handicapped person, includes a plurality of first key switches for inputting character input data in a general input mode, a single second key switch for inputting character input data in a second key input mode, a character input device for inputting the character input data in the general input mode inputted by operating the plurality of first key switches or in the single key input mode inputted by operating the single second key switch, a character output device for outputting at least character output data which corresponds to the character input data inputted by the character input device, a mode selector for selecting the character input data input in the general input mode by the character input device or the character input data input in the single key input mode by the character input device, and a controller for controlling the operation of the character input device, the character output device, and the input mode selector.

22 Claims, 31 Drawing Sheets

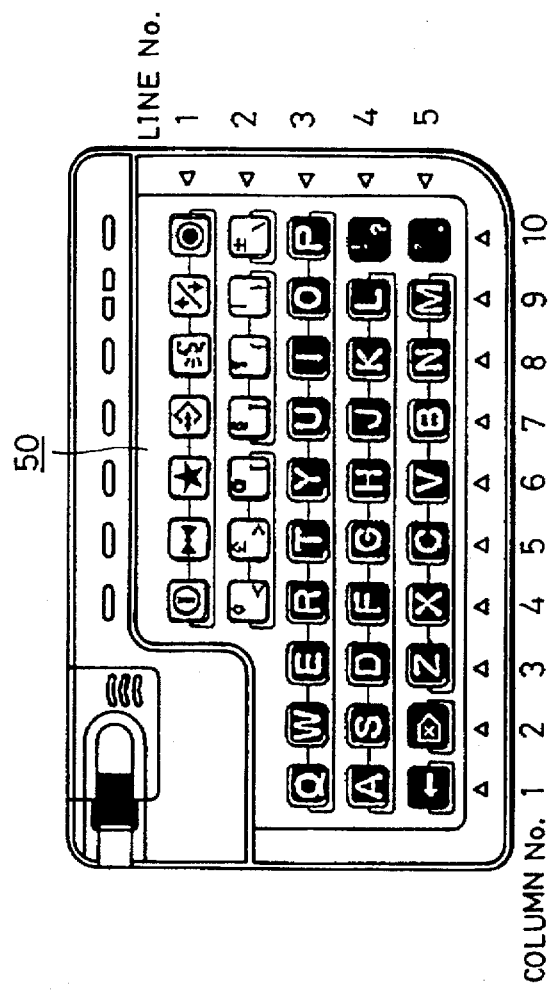
FIG. 3A
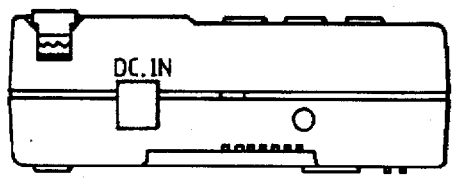
FIG. 3B
FIG. 3C

FIG. 4

| LINE NO.(L) | COLUMN NO. (C) | SYMBOL (KLC) | SIGN | NAME |
|---|---|---|---|---|
| 1 | 4 | K14 | ⊕ | POWER SUPPLY KEY |
| 1 | 5 | K15 | (((○))) | BUZZER KEY |
| 1 | 6 | K16 | ★ | CONTROL KEY |
| 1 | 7 | K17 | ←◇ | MESSAGE MEMORY KEY |
| 1 | 8 | K18 | ≳≲ | VOICE MEMORY KEY |
| 1 | 9 | K19 | ↑/↓ | UPPER/LOWER CHANGE-OVER KEY |
| 1 | 10 | K110 | ◉ | FIG. CHANGE-OVER KEY |
| 2 | 4 | K24 | < | SPECIAL CHARACTER ① KEY |
| 2 | 5 | K25 | > | SPECIAL CHARACTER ② KEY |
| 2 | 6 | K26 | [ | SPECIAL CHARACTER ③ KEY |
| 2 | 7 | K27 | ] | SPECIAL CHARACTER ④ KEY |
| 2 | 8 | K28 | { | SPECIAL CHARACTER ⑤ KEY |
| 2 | 9 | K29 | } | SPECIAL CHARACTER ⑥ KEY |
| 2 | 10 | K210 | \ | SPECIAL CHARACTER ⑦ KEY |
| 5 | 1 | K51 | ← | SPACE KEY |
| 5 | 2 | K52 | → | DELETE KEY |

| | PWR | BZ | ★ | MEM | SND | u/l | fig | LINE NO. |
|---|---|---|---|---|---|---|---|---|
| | < | > | [ | ] | { | } | \ | ○ 1 |
| | | | | | | | | ○ 2 |
| q | w | e | r | t | y | u | i | o | p | ○ 3 |
| a | s | d | f | g | h | j | k | l | ? | ● 4 |
| ← | → | z | x | c | v | b | n | m | . | ○ 5 |

COLUMU NO.  ● 1  ○ 2  ○ 3  ○ 4  ○ 5  ○ 6  ○ 7  ○ 8  ○ 9  ○ 10

FIG. 10

| KEY | COLUMNS OF CHARACTERS |
|---|---|
| POWER SUPPLY KEY | SO P SI (0E,50,0F) hex |
| BUZZER KEY | SO B SI (0E,42,0F) hex |
| CONTROL KEY | SO C SI (0E,43,0F) hex |
| MESSAGE KEY | SO M SI (0E,4D,0F) hex |
| VOICE KEY | SO S SI (0E,53,0F) hex |
| CAPITAL/SMALL CHARACTER SHIFT KEY | SO U SI (0E,55,0F) hex |
| SYMBOL SHIFT KEY | SO F SI (0E,46,0F) hex |
| KANA SHIFT KEY | SO K SI (0E,4B,0F) hex |

FIG. 11

|   |   |   | < | > | [ | ] | { | } | \ |
|---|---|---|---|---|---|---|---|---|---|
| q | w | e | r | t | y | u | i | o | p |
| a | s | d | f | g | h | j | k | l | ? |
|   |   | z | x | c | v | b | n | m | . |

FIG. 12

|   |   |   | ¢ | £ | @ | § |   | ǀ | ± |
|---|---|---|---|---|---|---|---|---|---|
| Q | W | E | R | T | Y | U | I | O | P |
| A | S | D | F | G | H | J | K | L | ! |
|   |   | Z | X | C | V | B | N | M | , |

FIG. 13

|   |   |   | 1/2 | 1/4 | 3/4 | 1/8 | 3/8 | 5/8 | 7/8 |
|---|---|---|-----|-----|-----|-----|-----|-----|-----|
| ( | ) | * | /   | %   | 7   | 8   | 9   | ÷   | -   |
| # | & | " | '   | $   | 4   | 5   | 6   | ×   | +   |
|   |   | ; | :   | 0   | 1   | 2   | 3   | .   | =   |

FIG. 14

|   |   |   | < | > | [ | ] | { | } | \ |
|---|---|---|---|---|---|---|---|---|---|
| a | b | c | d | e | f | g | h | i | j |
| k | l | m | n | o | p | q | r | s | ? |
|   |   | t | u | v | w | x | y | z | . |

FIG. 15

|   |   |   | ¢ | £ | @ | § |   | \| | ± |
|---|---|---|---|---|---|---|---|---|---|
| A | B | C | D | E | F | G | H | I | J |
| K | L | M | N | O | P | Q | R | S | ! |
|   |   | T | U | V | W | X | Y | Z | , |

FIG. 21

(CLEAR SOUND)

| HIRAGANA | KATAKANA | EXPRESSION 1 | EXPRESSION 2 | HIRAGANA | KATAKANA | EXPRESSION 1 | EXPRESSION 2 |
|---|---|---|---|---|---|---|---|
| あ | ア | A | | は | ハ | HA | |
| い | イ | I | | ひ | ヒ | HI | |
| う | ウ | U | | ふ | フ | HU | FU |
| え | エ | E | | へ | ヘ | HE | |
| お | オ | O | | ほ | ホ | HO | |
| か | カ | KA | | ま | マ | MA | |
| き | キ | KI | | み | ミ | MI | |
| く | ク | KU | | む | ム | MU | |
| け | ケ | KE | | め | メ | ME | |
| こ | コ | KO | CO | も | モ | MO | |
| さ | サ | SA | | や | ヤ | YA | |
| し | シ | SI | SHI | ゆ | ユ | YU | |
| す | ス | SU | | よ | ヨ | YO | |
| せ | セ | SE | | ら | ラ | RA | LA |
| そ | ソ | SO | | り | リ | RI | LI |
| た | タ | TA | | る | ル | RU | LU |
| ち | チ | TI | CHI, CI | れ | レ | RE | LE |
| つ | ツ | TU | TSU | ろ | ロ | RO | LO |
| て | テ | TE | | わ | ワ | WA | |
| と | ト | TO | | ん | ン | N | M |
| な | ナ | NA | | を | ヲ | WO | |
| に | ニ | NI | | | | | |
| ぬ | ヌ | NU | | | | | |
| ね | ネ | NE | | | | | |
| の | ノ | NO | | | | | |

FIG. 22

(VOICED SOUND)

| HIRAGANA | KATAKANA | EXPRESSION 1 | EXPRESSION 2 | HIRAGANA | KATAKANA | EXPRESSION 1 | EXPRESSION 2 |
|---|---|---|---|---|---|---|---|
| が | ガ | GA | | だ | ダ | DA | |
| ぎ | ギ | GI | | ぢ | ヂ | DI | |
| ぐ | グ | GU | | づ | ヅ | DU | |
| げ | ゲ | GE | | で | デ | DE | |
| ご | ゴ | GO | | ど | ド | DO | |
| ざ | ザ | ZA | | ば | バ | BA | |
| じ | ジ | ZI | JI | び | ビ | BI | |
| ず | ズ | ZU | | ぶ | ブ | BU | |
| ぜ | ゼ | ZE | | べ | ベ | BE | |
| ぞ | ゾ | ZO | | ぼ | ボ | BO | |

FIG. 23

(P-SOUND)

| HIRAGANA | KATAKANA | EXPRESSION 1 | EXPRESSION 2 | HIRAGANA | KATAKANA | EXPRESSION 1 | EXPRESSION 2 |
|---|---|---|---|---|---|---|---|
| は | パ | PA | | ぺ | ペ | PE | |
| ひ | ピ | PI | | ぽ | ポ | PO | |
| ふ | プ | PU | | | | | |

FIG. 24

(SYLLABIC NASAL)

| HIRAGANA | KATAKANA | EXPRESSION 1 | EXPRESSION 2 | HIRAGANA | KATAKANA | EXPRESSION 1 | EXPRESSION 2 |
|---|---|---|---|---|---|---|---|
| きゃ | キャ | KYA | | みゃ | ミャ | MYA | |
| きゅ | キュ | KYU | | みゅ | ミュ | MYU | |
| きょ | キョ | KYO | | みょ | ミョ | MYO | |
| しゃ | シャ | SYA | SHA | りゃ | リャ | RYA | |
| しゅ | シュ | SYU | SHU | りゅ | リュ | RYU | |
| しぇ | シェ | SYE | SHE | りょ | リョ | RYO | |
| しょ | ショ | SYO | SHO | ぎゃ | ギャ | GYA | |
| ちゃ | チャ | TYA | CHA | ぎゅ | ギュ | GYU | |
| ちゅ | チュ | TYU | CHU | ぎょ | ギョ | GYO | |
| ちぇ | チェ | TYE | CHE | じゃ | ジャ | ZYA | JA |
| ちょ | チョ | TYO | CHO | じゅ | ジュ | ZYU | JU |
| にゃ | ニャ | NYA | | じぇ | ジェ | ZYE | JE |
| にぃ | ニィ | NYI | | じょ | ジョ | ZYO | JO |
| にゅ | ニュ | NYU | | ぢゃ | ヂャ | DYA | |
| にぇ | ニェ | NYE | | ぢゅ | ヂュ | DYU | |
| にょ | ニョ | NYO | | ぢょ | ヂョ | DYO | |
| ひゃ | ヒャ | HYA | | びゃ | ビャ | BYA | |
| ひゅ | ヒュ | HYU | | びゅ | ビュ | BYU | |
| ひょ | ヒョ | HYO | | びょ | ビョ | BYO | |
| ふぁ | ファ | FA | | ヴぁ | ヴァ | VA | |
| ふぃ | フィ | FI | | ヴぃ | ヴィ | VI | |
| ふぇ | フェ | FE | | ヴ | ヴ | VU | |
| ふぉ | フォ | FO | | ヴぇ | ヴェ | VE | |
| ぴゃ | ピャ | PYA | | ヴぉ | ヴォ | VO | |
| ぴゅ | ピュ | PYU | | | | | |
| ぴょ | ピョ | PYO | | | | | |

FIG. 25

(SMALL CHARACTER)

| HIRAGANA | KATAKANA | EXPRESSION 1 | EXPRESSION 2 | HIRAGANA | KATAKANA | EXPRESSION 1 | EXPRESSION 2 |
|---|---|---|---|---|---|---|---|
| あ | ア | XA | | っ | ッ | XTU | |
| い | イ | XI | | や | ャ | XYA | |
| う | ウ | XU | | ゅ | ュ | XYU | |
| え | エ | XE | | ょ | ョ | XYO | |
| お | オ | XO | | でぃ | ディ | DYI | DXI |
| | | | | でぃ | ティ | TYI | TXI |

DIRECTION OF FEED OF PAPER TAPE

DIRECTION OF FEED OF PAPER TAPE

FIG. 28
① ORDINARY PRINTING
-ALPHANUMERIC, SYMBOL
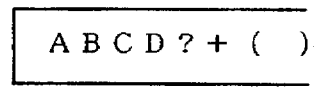
② DOUBLE WIDTH PRINTING
-ALPHANUMERIC, SYMBOL
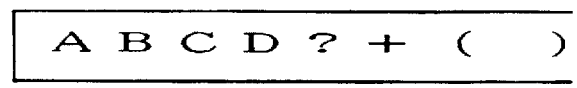
-KATAKANA
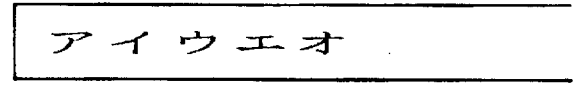
-HIRAGANA (USUALLY DOUBLE WIDTH, NO DOUBLE WIDTH
   MODE AVAILABLE FOR HIRAGANA)
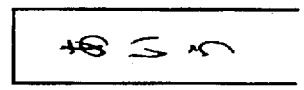 ←--- ENTER "あ" IN VERTICAL POSTURE
-TELEPHONE MARK (USUALLY DOUBLE WIDTH)
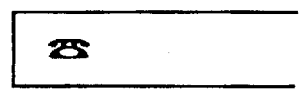
③ RIPLE WIDTH PRINT FRACTION
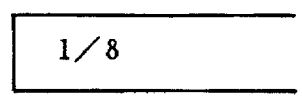

FIG. 32

| BAUD RATE bps |
|---|
| 75 |
| 110 |
| 300 |
| 600 |
| 1200 |
| 2400 |
| 4800 |
| 9600 |

| DATA LENGTH BIT |
|---|
| 7 |
| 8 |

| PARITY |
|---|
| none |
| odd |
| even |

| STOP BIT |
|---|
| 1 |
| 2 |

| HAND SHAKE |
|---|
| none |
| xon/xoff |
| cts/rts |
| xon/cts |

FIG. 33

| CHARACTER ENTRY | SAMPLING FREQUENCY | BIT RATE | RECORDING/ REPRODUCTION TIME |
|---|---|---|---|
| 1 | 8 KHz | 32 Kbps | 1 MINUTE = 60 SECONDS |
| 2 | 4 KHz | 16 Kbps | 2 MINUTES = 120 SECONDS |
| 3 | 2.7 KHz | 11 Kbps | 3 MINUTES = 180 SECONDS |
| 4 | 2 KHz | 8 Kbps | 4 MINUTES = 240 SECONDS |

DIRECTION OF FEED OF PAPER TAPE

DIRECTION OF FEED OF PAPER TAPE

COMMUNICATION APPARATUS INCLUDING A PLURALITY OF LIGHT SOURCES ARRANGED IN COLUMNS AND LINES CORRESPONDING TO COLUMNS AND LINES OF A PLURALITY OF KEY SWITCHES

BACKGROUND OF THE INVENTION

1. Field of the Invention

The present invention relates to a communication apparatus which permits a person having a hearing, a speech, or a muscular function handicap to communicate with another person by means of characters or voice.

2. Description of the Prior Art

Communication with others is an important factor in living as a member of a society. Therefore it is critical that speech handicapped persons and muscular handicapped persons overcome their difficulties in communicating. As a result, communication apparatuses employing electronic technology have been developed since the 1970's. An example of such conventional technology is shown in FIGS. 34 and 35.

FIG. 34 is a schematic view which illustrates a conventional communication apparatus for a physically handicapped person. FIG. 35 is a block diagram which illustrates the structure of the communication apparatus shown in FIG. 34.

The aforesaid communication apparatus comprises an input device 1 such as a keyboard, an output device 2 such as a thermal printer, a control device 3 such as a microprocessor for performing operations in accordance with a program stored previously, a storage device 4 consisting of a read only memory for storing the aforesaid program and a random access memory for temporarily storing data supplied from the input device 1, and a communication device for transmitting/receiving data to and from an external device (not shown) by means of serial communication.

Characters supplied through the keyboard 1 are, by the control device 3, converted into signals for use in the thermal printer, and then the signals are sequentially recorded on a paper tape by the built-in thermal printer. In the state shown in FIG. 34, characters A, B and C have been already received by the printer and printed on a paper tape 2a. A detailed view (an enlarged state of the characters) of the paper tape is shown in FIG. 36. When a deletion key la shown in FIG. 34 is depressed, the paper tape 2a is moved to the right, so that full-dot printing is performed at the position of the character C. A state where the character C has been deleted is shown in FIG. 37. When a space key 1a shown in FIG. 34 is then depressed, the paper tape 2a is moved to the left.

However, the above-mentioned communication apparatus has the following problems:

(1) Since the only output device is the output device 2 for printing data to the paper tape 2a, communication takes a long time.

(2) Since the only input device is a keyboard, the apparatus cannot be used by a person such as a muscularly handicapped person who cannot easily use a keyboard because his function of the fingers is impaired.

(3) Since characters, inputted through the keyboard 1 having keys in a Roman character configuration, are directly printed to the paper tape 2a or are temporarily stored in the storage device 4 and then are printed, Japanese characters must be formed into Roman characters.

SUMMARY OF THE INVENTION

Accordingly, a first object of the present invention is to provide a communication apparatus capable of quickly transmitting the user's intention, and easily inputting characters and printing characters in addition to the Roman characters.

A second object of the present invention is to enable character input data to be inputted by using a single key switch of, for example, an external switch as well by using, for example, a plurality of key switches on a keyboard of a character input/output device by selecting either a general input mode or single key input mode by input selection means.

A third object of the present invention is to enable a character output device to properly output character output data, which correspond to the character input data, to the surface of, for example, a paper tape in the case where a character input device inputs character input data.

A fourth object of the present invention is to cause Japanese character input data in the form of Roman characters inputted in a general input mode or a single key input mode to be converted into hiragana or katakana characters by a Japanese word processing means so as to be outputted from a character input/output device.

A fifth object of the present invention is to cause character information reproducing means to reproduce character information, which has been previously stored at a predetermined address by, for example, a key input, as character output data so as to be outputted from a character input/ output device.

A sixth object of the present invention is to enable either of a first or a second key arrangement of a plurality of key switches of a character input device to be selected to suit the state of the use of the apparatus by key arrangement selection means.

A seventh object of the present invention is to cause unused output control means to make a character input/ output device output unused addresses of the addresses of a character information storage device and residual number of characters which can be stored by a character information storage device.

An eighth object of the present invention is to enable character output data to be so outputted as to satisfy the form of a first language or a second language by outputting character output data of a first language group in a first direction while forming the dots into first and a second dot configurations and by outputting character output data of a second language group in a second direction while forming the dots into a third dot configuration.

A ninth object of the present invention is to enable character output data to be outputted by making use of the characteristics of a first language group composed of English, a Northern or Western European language, Spanish, German, French and katakana of Japanese and a second language group composed of hiragana of Japanese.

A tenth object of the present invention is to enable character output data to be outputted easily and properly while making use of the characteristics of first and the second language groups by arranging first, second and the third dot configurations to be (5×7), (15×7) and (10×7), respectively.

An eleventh object of the present invention is to enable character output data to be outputted in directions suitable for the form of each of first and the second language groups by making first and second directions different from each other by 90° or an odd number times 90°.

A twelfth object of the present invention is to enable voice output to be made by means for outputting information about the user's intention and to enable a printed output to be made by a character output device which prints information on a paper tape so that the voice output device reproduces recorded voice information, corresponding to a predetermined address, so as to output the voice information.

A thirteenth object of the present invention is to enable a voice output to be made by providing a voice input device which inputs voice information, a voice storage device for storing the inputted voice information which is made to correspond to an address, a voice output device which outputs the voice information stored in the voice storage device at the time of reproducing the voice information, and a voice control device which controls the storage/reproduction of the voice information.

A fourteenth object of the present invention is to provide control means which causes unused addresses in a voice storage device and a residual time in which the voice information can be recorded, to be outputted from a character input/output device.

A fifteenth object of the present invention is to enable voice information, which corresponds to character information, to be outputted simultaneously with the character information by providing a structure in which voice information reproducing means produces the character information and the voice information stored by a voice storage device which information is made to correspond to predetermined addresses in a predetermined sequential order so as to be outputted from a voice output device.

A sixteenth object of the present invention is to also enable data of, for example, another communication apparatus to be outputted from a character input/output device by providing a communication device controlled by a control device to transmit and receive communication data to and from an external apparatus.

A seventeenth object of the present invention is to minimize the storage region of a character code table by providing a code transmitting/receiving means which expresses a code, which is not defined by the character code table, by connecting a plurality of character codes defined by the character code table and transmitting or receiving the expressed code as the communication data.

An eighteenth object of the present invention is to enable a process, which uses character input data and operation parameters of, for example, another communication apparatus to be performed by providing an apparatus in which communication data is made to be the character input data and the operation parameter data.

A nineteenth object of the present invention is to enable the operation of, for example, another communication apparatus to be controlled by providing an external apparatus control means which transmits/receives data via the another communication apparatus.

A twentieth object of the present invention is to enable the communication apparatus according to the present invention to be also used as a desktop calculator by arranging its structure in such a manner that, when a calculation function mode is selected, a calculation function means performs a calculation process in accordance with character input data so as to cause the character input/output device to output the result of the calculation.

According to one aspect, the present invention, which achieves at least one of these objects, relates to a communication apparatus for a handicapped person, comprising a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, character output means for outputting at least character output data which corresponds to the character input data inputted by the character input means, input mode selection means for selecting the character input data input in the general input mode by the character input means or the character input data input in the single key input mode by the character input means, and control means for controlling the operation of the character input means, the character output means and the input mode selection means.

The apparatus can further comprise Japanese word processing means for converting Japanese into hiragana or katakana and for controlling the character output means so as to output hiragana or katakana as the character output data when the character input data inputted in the general input mode or the single key input mode is Japanese.

According to another aspect, the present invention, which achieves at least one of these objects, relates to a communication apparatus for a handicapped person, comprising, a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, character output means for outputting at least character output data which corresponds to the character input data inputted by the character input means, character information storage means for storing the character input data inputted by the character input means as character information at a predetermined address, character information reproducing means for causing the character information stored by the character information storage means to be output from the character output means in order to reproduce the character information as the character output data, and control means for controlling the operations of the character input means, the character output means, the character information storage means and the character information reproducing means.

According to another aspect, the present invention, which achieves at least one of these objects, relates to a communication apparatus for a handicapped person, comprising a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, character output means for outputting at least character output data which corresponds to the character input data inputted by the character input means, key arrangement selection means for selecting a key arrangement from a variety of key arrangements provided for the plurality of first key switches, and control means comprising the key arrangement selection means, and for controlling the character input means, the character output means and the key arrangement selection means.

According to still another aspect, the present invention, which achieves at least one of these objects, relates to a communication apparatus for a handicapped person, comprising a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, character output means for outputting at least character output data which corresponds to the character input data inputted by the character input means, character information storage means for storing the character input data inputted by the character input means as character information at a predetermined address, unused output control means for causing unused addresses of the character information storage means at which character input data is not stored and a residual number of characters of the character input data which can be stored by the character information storage means to be outputted from the character output means, and control means, comprising the unused output control means, for controlling the operations of the character input means, the character output means and the unused output control means.

According to still another aspect, the present invention, which achieves at least one of these objects, relates to a communication apparatus for a handicapped person, comprising a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, character output means for outputting at least character output data, which corresponds to the character input data inputted by the character input means, in such a manner that a first language group is outputted in a first direction while being formed into a first and a second dot configuration and a second language group is outputted in a second direction while being formed into a third dot configuration, input mode selection means for selecting the character input data in the general input mode or the character input data in the single key input mode inputted by the character input means, and control means for controlling the operations of the character input means, the character output means, and the input mode selection means.

The first language group is composed of English, a North European language, Spanish, German, French and Katakana of Japanese and the second language group is composed of hiragana of Japanese.

The first and second and third dot configurations, respectively, are formed into configurations (5×7), and (15×7) and (10×7).

The first and second directions are different from each other by 90° or an odd number times 90°.

According to yet another aspect, the present invention, which achieves at least one of these objects, relates to a communication apparatus for a handicapped person, comprising, a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, voice input means for inputting voice information, voice storage means for storing the voice information inputted by the voice input means as character information at a predetermined address, voice output means for outputting voice information stored in the voice storage means at the time of reproducing the voice information, voice control means for controlling recording and/or reproducing of the voice information, and control means for controlling the operations of the character input means, the voice input means, the voice storage means, the voice output means, and the voice control means.

The apparatus can further comprise character output means for outputting the character output data, which corresponds to the character input data inputted by the character input means.

The apparatus can also comprise unused control means for causing unused addresses of the voice storage means and a residual time for recording the voice information to be outputted from the character output means, wherein the control means controls the unused control means.

According to still another aspect, the present invention, which achieves at least one of these objects, relates to a communication apparatus for a handicapped person, comprising a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, character output means for outputting at least character output data which corresponds to the character input data inputted by the character input means, character information storage means for storing the character input data inputted by the character input means as character information at a predetermined address, character information reproducing means for causing the character information stored by the character information storage means to be outputted from the character output means in order to reproduce the character information as the character output data, voice input means for inputting voice information, voice storage means for storing the voice information inputted by the voice input means at a predetermined address, voice output means for outputting the voice information stored by the voice storage means at the time of reproducing the voice information, and control means for controlling the character information reproducing means, the character information storage means, and the voice storage means in such a manner that the predetermined address of the character information and the voice information is specified so as to permit the character information reproducing means to cause the character information stored by the character information storage means to be outputted from the character output means and so as to cause the voice output means to output the voice information stored by the voice storage means so as to reproduce the character information and the voice information in a predetermined sequential order.

According to another aspect, the present invention, which achieves at least one of these objects, relates to a communication apparatus for a handicapped person, comprising a plurality of first key switches for inputting character input data in a general input mode, a single second key switch for inputting character input data in a single key input mode, character input means for inputting the character input data input in the general input mode inputted by operating the plurality of first key switches or in the single key input mode inputted by operating the single second key switch, character output means for outputting at least character output data which corresponds to the character input data inputted by the character input means, input mode selection means for selecting the character input data in the general input mode by the character input means or the character input data input in the single key input mode by the character input means, control means for controlling the operations of the character input means, the character output means and the input mode selection means, and communication means, controlled by the control means, for communicating communication data, including the character input data, with an external apparatus.

The apparatus can further comprise code transmitting/ receiving means for generating a code which is not defined by a character code table by connecting a plurality of character codes defined by a character code table and causing the code to be transmitted/received as the communication data. The communication data is composed of the character input data and an operation parameter. The apparatus can further comprise external apparatus control means for controlling the external apparatus via the communication means.

According to still another aspect, the present invention, which achieves at least one of these objects, relates to an apparatus for a handicapped person, comprising a plurality of first key switches for inputting character input data in a general input mode, a single second key switch for inputting character input data in a single key input mode, character input means for inputting the character input data in the general input mode inputted by operating the plurality of first key switches or in the single key input mode inputted by operating the single second key switch, character output means for outputting at least character output data which corresponds to the character input data inputted by the character input means, input mode selection means for selecting the character input data inputted in the general input mode by the character input means or the character input data inputted in the single key input mode by the character input means and for selecting a calculation function mode, calculation function means for performing a predetermined calculation process in accordance with the character input data when a calculation function mode is selected by the input mode selection means and for causing the result of the calculation process to be outputted by the character output means, and control means for controlling the operations of the character input means, the character output means, the input mode selection means and the calculation function means.

Other and further objects, features and advantages of the invention will be appear more fully from the following detailed description of preferred embodiments when taken in conjunction with the attached drawings.

BRIEF DESCRIPTION OF THE DRAWINGS

FIG. 3A is a plan view which illustrates the communication apparatus according to the embodiment shown in FIG. 1;

FIG. 3B is a left side cross sectional view which illustrates the communication apparatus according to the embodiment shown in FIG. 1;

FIG. 3C is a bottom cross sectional view which illustrates the communication apparatus according to the embodiment shown in FIG. 1;

FIG. 4 illustrates the names of the key switches of a character input device of the apparatus shown in FIG. 1;

FIG. 10 illustrates the relationship between the character column and the operation key switches of the apparatus according to the embodiment shown in FIG. 1;

FIG. 11 illustrates the relationship between the key switches and characters of the character input device of the apparatus according to the embodiment shown in FIG. 1;

FIG. 12 illustrates another relationship between the key switches and the characters of the character input device of the apparatus according to the embodiment shown in FIG. 1;

FIG. 13 illustrates another relationship between the key switches and the characters of the character input device of the apparatus according to the embodiment shown in FIG. 1;

FIG. 14 illustrates another relationship between the key switches and the characters of the character input device of the apparatus according to the embodiment shown in FIG. 1;

FIG. 15 illustrates another relationship between the key switches and the characters of the character input device of the apparatus according to the embodiment shown in FIG. 1;

FIG. 21 illustrates a clear sound conversion table;

FIG. 22 illustrates a voiced sound conversion table;

FIG. 23 illustrates a p-sound conversion table;

FIG. 24 illustrates another clear sound conversion table;

FIG. 25 illustrates a small character conversion table;

FIG. 28 schematically illustrates character fonts;

FIG. 32 illustrates the operation parameter of a communication device of the apparatus according to the embodiment shown in FIG. 1;

FIG. 33 illustrates the relationship between the input characters made by the device and various data items in the apparatus according to the embodiment shown in FIG. 1;

DESCRIPTION OF THE PREFERRED EMBODIMENT

Figure 1:
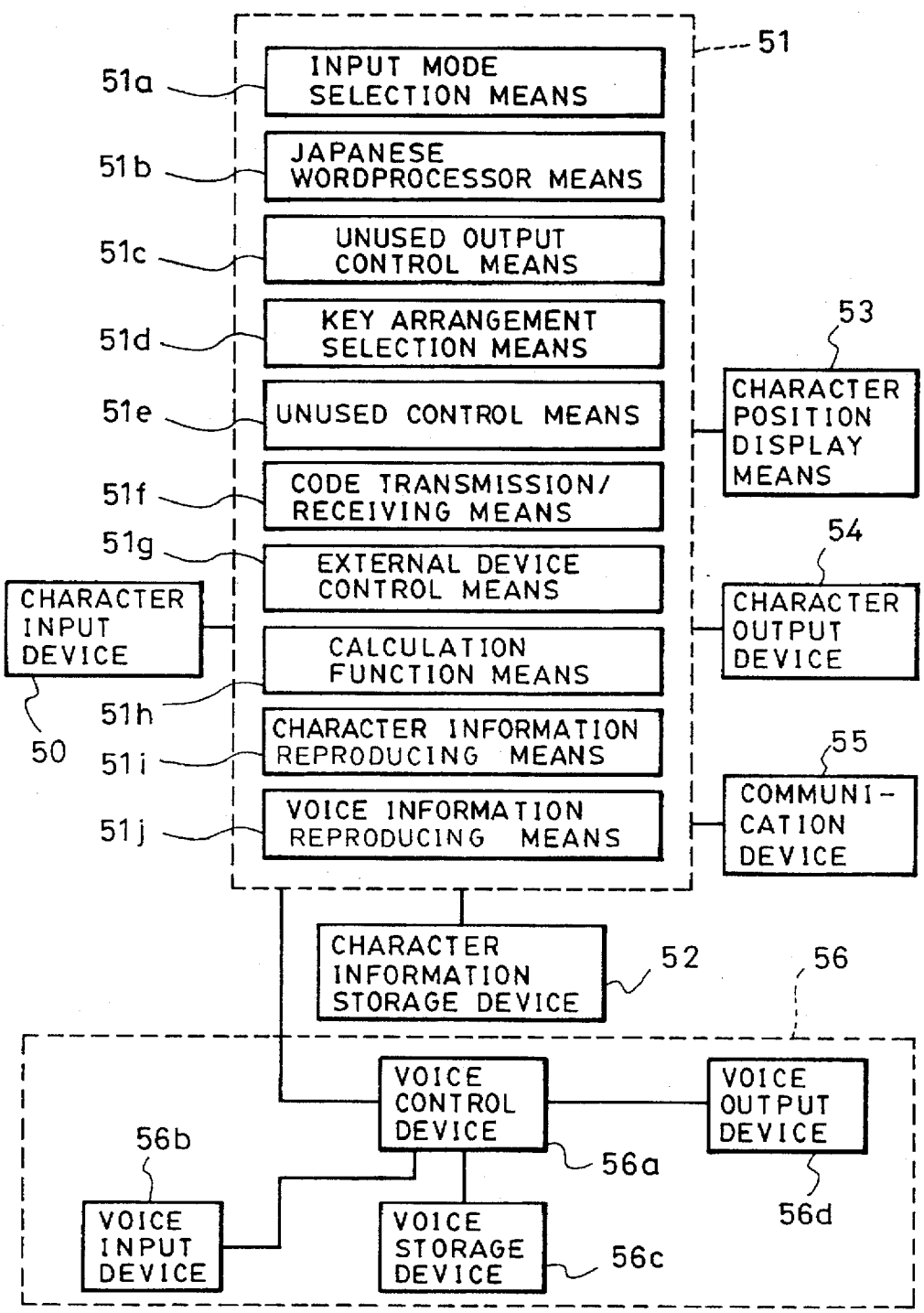
FIG. 1 is a block diagram which illustrates the schematic structure of an embodiment of a communication apparatus according to the present invention.
Figure 2:
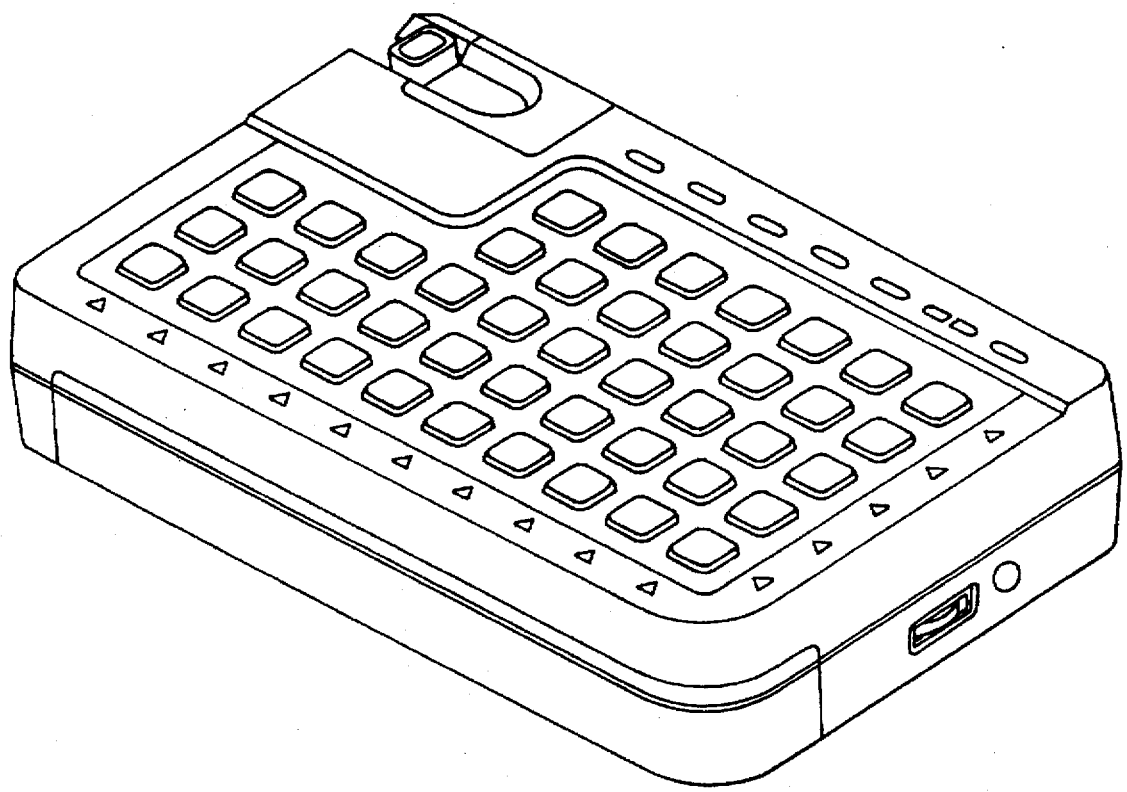
FIG. 2 is perspective view which illustrates the appearance of the communication apparatus according to the embodiment shown in FIG. 1.

Preferred embodiments of the present invention will now be described with reference to the drawings. FIG. 1 is a block diagram which illustrates the schematic structure of an embodiment of a communication apparatus according to the present invention. FIG. 2 is perspective view which illustrates the appearance of the communication apparatus according to the embodiment shown in FIG. 1. FIG. 3A is a plan view which illustrates the communication apparatus according to the embodiment shown in FIG. 1. FIG. 3B is a left side cross sectional view which illustrates the communication apparatus according to the embodiment shown in FIG. 1. FIG. 3C is a bottom cross sectional view which illustrates the communication apparatus according to the embodiment shown in FIG. 1. FIG. 4 illustrates names of the key switches of a character input device of the apparatus shown in FIG. 1.

Referring to FIG. 1, the communication apparatus has a character input device 50 such as a keyboard in which a plurality of key switches named as shown in FIG. 4 are arranged. Each key switch is given symbol (KLC) which corresponds to both the line No. (L) and the column No. (C). The character input device 50 is connected to a control device 51 which controls the overall operation of the communication apparatus.

The control device 51 comprises an input mode selection means 51a, a Japanese word processing means 51b, an unused output control means 51c, a key arrangement selection means 51d, an unused control means 51e, a code transmitting/receiving means 51f, an external apparatus control means 51g, a calculation function means 51h, a character information reproducing means 51i and a voice information reproducing means 51j.

Furthermore, a storage device 52, a character position indicating device 53 and a character output device 54 are connected to the control device 51. The storage device 52 is composed of a ROM (Read Only Memory) and a RAM (Random Access Memory). The ROM stores an operation program for operating the communication apparatus and the font to be printed by the character output device 54, the ROM being arranged to conserve stored data even if the power supply is switched off. The RAM stores the operation parameters for operating the communication apparatus and character input data supplied through the character input device 50, the stored data being reloadable when the operation of the apparatus proceeds or when the operation mode of the apparatus is changed. Although the data stored in the RAM is not conserved if the power supply is switched off, the apparatus according to the present invention has a back-up power supply comprising a lithium battery.

Figures 5, 6:
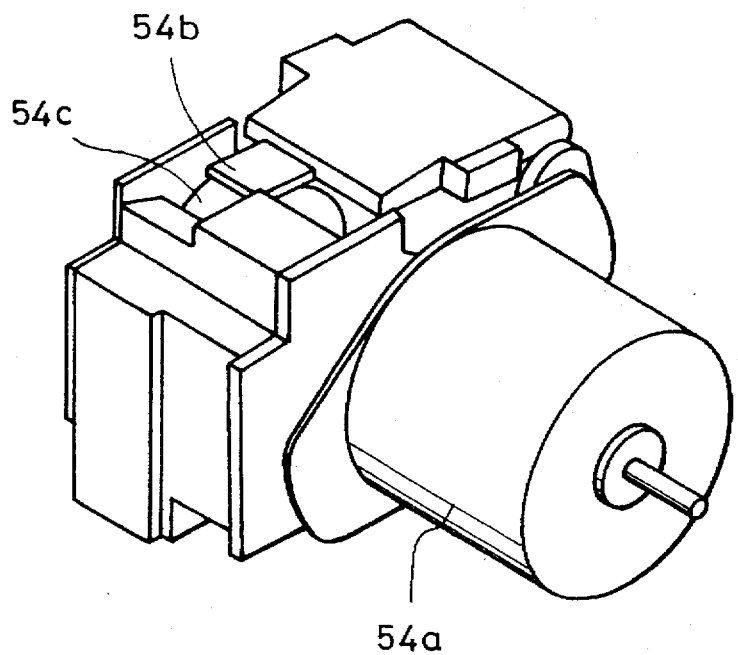
FIG. 5 illustrates the appearance of a character position indication device of the apparatus according to the embodiment shown in FIG. 1.
FIG. 6 illustrates the appearance of a character output device of the apparatus according to the embodiment shown in FIG. 1.
Figure 7:
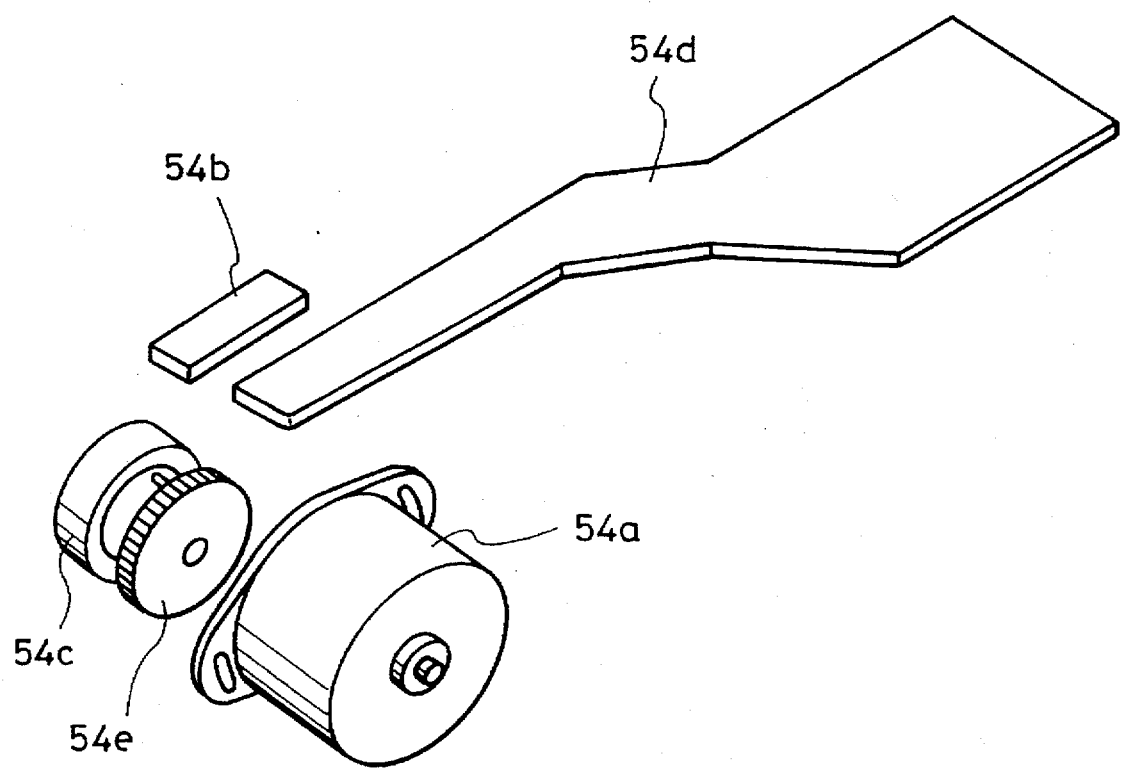
FIG. 7 illustrates the mechanism of the character output device of the apparatus according to the embodiment shown in FIG. 1.

The character position indication device 53 comprises a plurality of light emitting diodes (hereinafter called an "LED"), the character position indication device 53 being formed as shown in FIG. 5. The LED's are arranged horizontally beneath the keyboard and denote columns 1–10 of characters on the keyboard. Five LED's are arranged vertically to the right of the keyboard and denote lines 1–5 of characters on the keyboard. One column LED and one line LED are adapted to be lit simultaneously as shown in FIG. 5 to denote the depressed key. As shown in FIGS. 6 and 7, the character output device 54 comprises, for example, a 4-phase stepping motor 54a, a 7-dot TPH (Thermal Printer Head) 54b, a rubber roller 54c, a conductor 54d for the TPH 54b and a gear train 54e.

Furthermore, a communication device 55 and a voice device 56 are connected to the control device 51. The communication device 55 acts to transmit/receive data to and from, for example, a personal computer (an external device, omitted from illustration) by means of serial non-synchronous communication.

Figure 8:
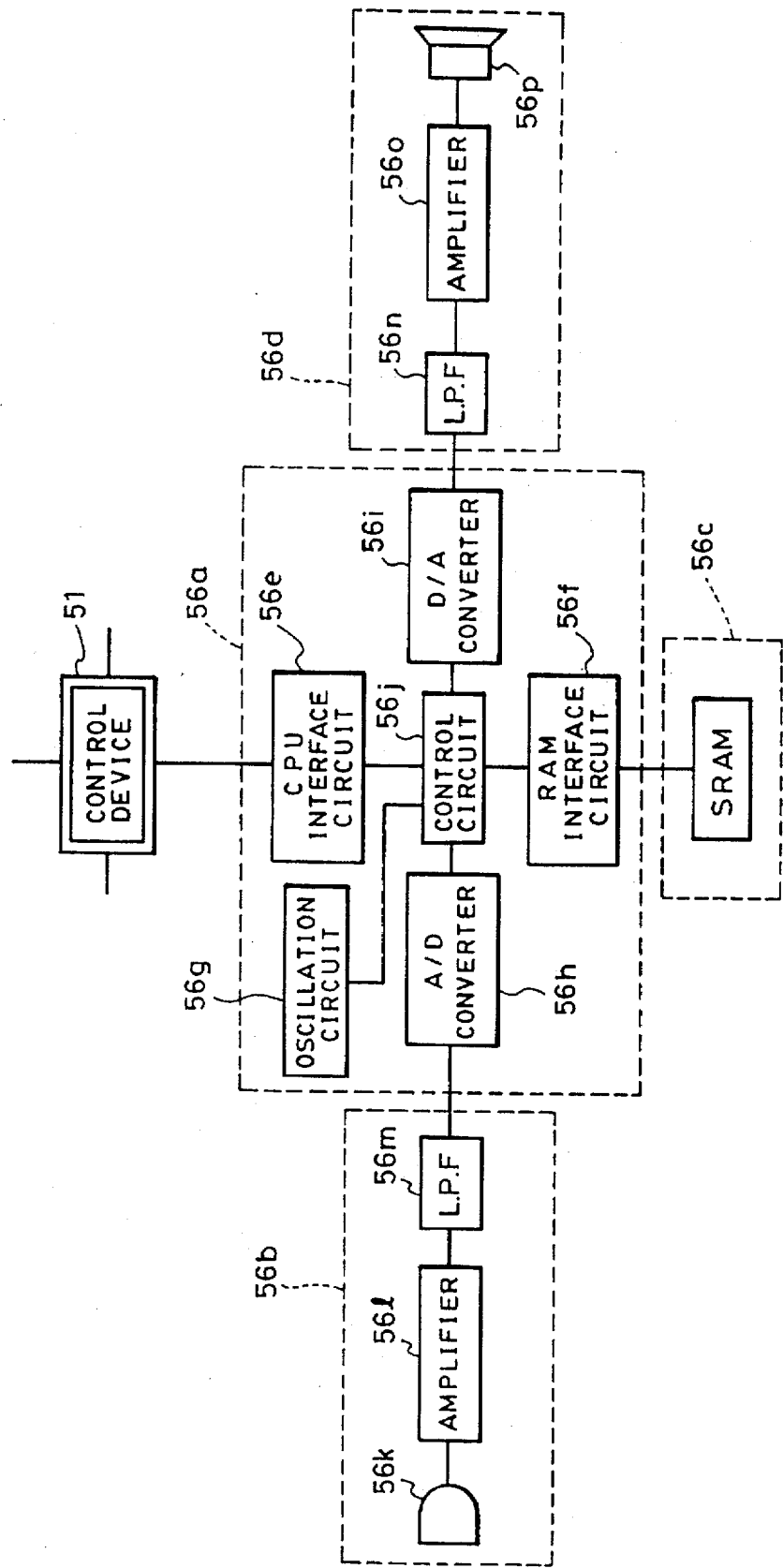
FIG. 8 is a block diagram which illustrates the internal structure of a voice device of the apparatus according to the embodiment shown in FIG. 1.

The voice device 56 comprises a voice control device 56a connected to the control device 51, a voice input device 56b, a voice storage device 56c and a voice output device 56d. FIG. 8 shows its internal structure.

Referring to FIG. 8, the voice control device 56a comprises a CPU interface circuit 56e for transmitting/receiving data to and from the control device 51, a RAM interface circuit 56f for transmitting/receiving data to and from the voice storage device 56c, an oscillation circuit 56g for generating clock pulses required to perform the operations of voice control device 56a, an analog/digital converter 56h, a digital/analog converter 56i, and a voice control circuit 56j for controlling the aforesaid operations. Furthermore, the voice input device 56b comprises a microphone 56k for inputting voice information, an amplifier 56l for amplifying a voice signal from the microphone 56k and an input low-pass filter 56m receiving a voice signal from the amplifier 56l, whereby a required voice signal is obtained.

The voice storage device 56c is a device for storing digital data converted from analog data and is composed of a static random access memory (SRAM) and the like. The voice output device 56d comprises an output low-pass filter 56n for obtaining a required voice signal converted from digital data to analog data by converter 56i, an output amplifier 56o for amplifying the voice signal from the filter 56n and a speaker 56p for outputting voice.

The operation of the communication apparatus constituted as described above will now be described with reference to FIG. 9 which illustrates an operation flow chart for the communication apparatus according to the present invention.

First, a power supply key (K14) is depressed to actuate the apparatus, so that the operation of the apparatus is commenced (step 100). When a control key (K16) is depressed for 2 seconds or longer (step 101), a function setting mode (initial setting) (step 102), the supply of a message to the storage device 52 (steps 103 and 104) and the input of voice information to the voice storage device 56c (steps 105 and 106) are commenced. If the time during which the control key (K16) is depressed is shorter than 2 seconds, a special mode can be set by using a special character key and a control code can be transmitted (steps 107 and 108). If no other key is depressed after the power supply key (K14) has been depressed, a normal communication mode is started (step 109).

In the initial setting operation in step 102, operation modes, such as a language setting mode (step 110), a keyboard setting mode (step 111), and a basic operation setting mode (step 112), are started and an operation parameter is set.

In the language setting mode in step 110, one language is selected from 7 kinds of languages consisting of a first language group including English, a Northern European language or a Western European Language, Spanish, German, French and katakana and a second language group including hiragana. In the keyboard setting mode in step 111, a keyboard arrangement is selected from two types of arrangements consisting of a first key arrangement QWERTY and a second key arrangement ABCDEF. In the basic operation setting mode in step 112, a general input mode or a sole key input mode (hereinafter called an "SKO" mode) is set. The general input mode is a mode in which a message (character output data) can be printed to a tape by using a keyboard, or sentences (character input data) can be registered in the storage device 52 so as to be printed, or voice information can be recorded in the voice storage device 56c so as to be reproduced. The SKO mode is a mode in which any one of the keys except for the power supply key (K14) and a buzzer key (K15) is depressed to select a line and a column, the LED of which is lit, so that key input is enabled.

Each of the aforesaid general input mode and the SKO mode can be set to three types of operations modes (a normal operation mode, a message calling only mode and a voice calling only mode). The message calling only mode is a mode in which the registered sentence can be taken out of memory by simply inputting a registered address (A to Z) by using a character information reproducing means 51i, while the voice calling only mode is a mode in which a recorded voice recorded in the voice recording device 56c can be taken out of memory by simply inputting a registered address (A to Z).

In step 113, the parameter for RS232, which is the standard interface of the EIC (Electronic Industry Association), is set. If the flow is able to proceed to the next step 114, a transfer operation and a memory damp operation (step 115) can be performed in which the message (character input data) stored in the storage device 52 or all of the set parameters can be transferred to another communication apparatus via the communication device 55. In step 117, the message or all of the parameters stored in the storage device 52 are cleared after a delete step 116.

In steps 103 and 104, a message memory key (K17) is depressed to specify an address (A to Z), and then a message is inputted to the RAM of the storage device 52 which corresponds to the specified address. When the memory is filled with data, an alarm is issued. If the operation of this mode is completed, the message memory key (K17) is again depressed to escape from this mode. The input can be performed consecutively to the other address.

In steps 105 and 106, the voice memory key (K18) is depressed to specify an address (A to Z), and voice information is, by using the voice input device 56b, inputted to the memory of the voice storage device 56c which corresponds to the specified address. If the operation of this mode is completed, the voice memory key (K18) is again depressed to escape from this mode. The input can be performed consecutively to the other address.

In the operation mode setting operation in step 107 by using the special character key, the following setting operations are performed: when a special character (1) key (K24) is depressed, an printing on/off process in step 107a is performed so that the character output device 54 is turned on/off so that whenever the special character (1) key is depressed the character output device 54 is alternately turned on/off. When a special character (2) key (K25) is depressed, the double width printing turning on/off operation in step 107b is performed so that the width of the characters to be printed by the character output device 54 is switched between a standard width and a double width. Also, whenever the aforesaid key is depressed, the standard width and the double width are alternately switched. When a special character (3) key (K26) is depressed, a calculation function mode is actuated. In step 107c, the operation of turning on/off a calculation function means 51h is performed so that the calculation function is turned on/off. Also, whenever the aforesaid special character (3) key is depressed, the calculation function means 51h is turned on/off. In addition, another communication apparatus can be operated in step 108 by using the external apparatus control means 51g in such a manner that the aforesaid control code (special character columns as shown in FIG. 10) is transmitted via the communication device 55.

If the normal communication mode is selected in step 109, the control key is operated in step 119 so as to select step 107 or 108, and as well as the operations of selecting a symbol (step 120), selecting a capital/small character (step 121), outputting a message (steps 122 and 123), and outputting voice information (steps 124 and 125) can be performed.

The operation of inputting characters by using the character input device 50 will now be described.

The character input device 50 has the input mode selection means 51a connected thereto, whereby either of the aforesaid general input mode and the SKO mode can be selected. In the general input mode, information is supplied from a plurality of keys on the keyboard which constitutes the character input device 50 arranged as shown in FIG. 3. The correspondence between the key switches of the keyboard and the characters varies depending upon the language previously selected from the aforesaid 7 languages. Furthermore, the keyboard arrangement can be selected from the two types of arrangements (ABCDEF and QWERTY) by using the key arrangement selection means 51d as shown in FIGS. 11 to 15 for example.

FIG. 11 illustrates the case where English, the QWERTY arrangement, and small characters are set, FIG. 12 illustrates the case where English, the QWERTY arrangement and capital characters are set, FIG. 13 illustrates the case where English and decorative characters are set, FIG. 14 illustrates the case where English, the ABCDEF arrangement and small characters are set, FIG. 15 illustrates the case where English, the ABCDEF arrangement and capital characters are set. The decorative characters are set in a similar manner to the QWERTY arrangement.

Figure 16:
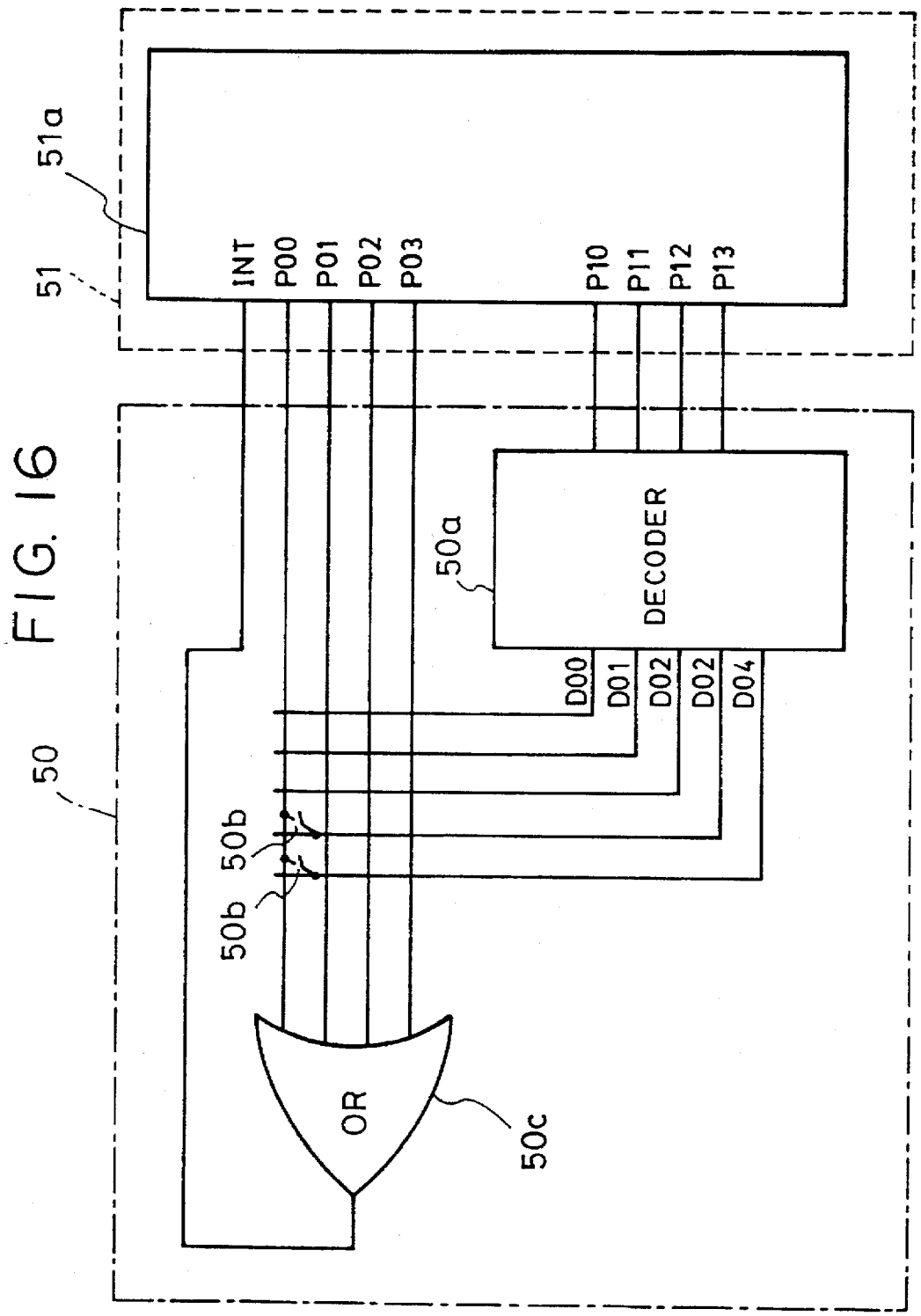
FIG. 16 is a circuit diagram which illustrates the connection established between the character input device and the control device of the apparatus according to the embodiment shown in FIG. 1.
Figure 17:
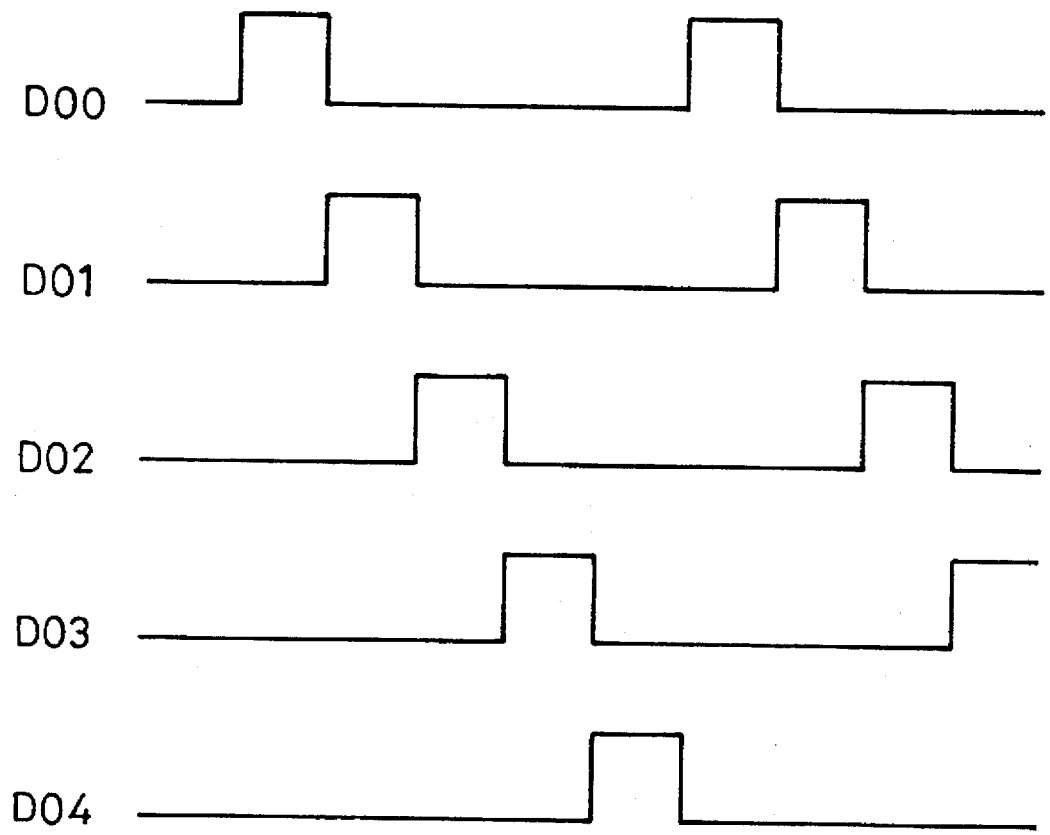
FIG. 17 is a time chart which illustrates key scan pulses in the circuit shown in FIG. 16.

The character input data selected by the keyboard of the character input device 50 is received by the control device 51. Then, the operation of the character input device 50 and the control device 51 will now be described with reference to FIGS. 16 and 17. FIG. 16 illustrates the connection of the character input device and the control device. FIG. 17 is a time chart which illustrates key span pulses.

The control device 51 has a control element 51a including terminals P10 to P13 serving as output terminals and terminals P00 to P03 serving as input terminals. An INT terminal is an interruption terminal whereby interruption of an operation performed by the control device 51 takes place if the input level at the INT terminal has been shifted from the low level to the high level so that the interruption control is performed in this way. The terminals P10 to P13 repeatedly output signals at 10 ms intervals, for example, increasing the binary output from "0001" to "0100". The outputs thus made are supplied to a binary-octal decoder 50a, so that the scan pulses D00 to D04 of the input key switch 50b are generated. The aforesaid operation is shown in FIG. 17 which is a timing chart.

Figure 18:
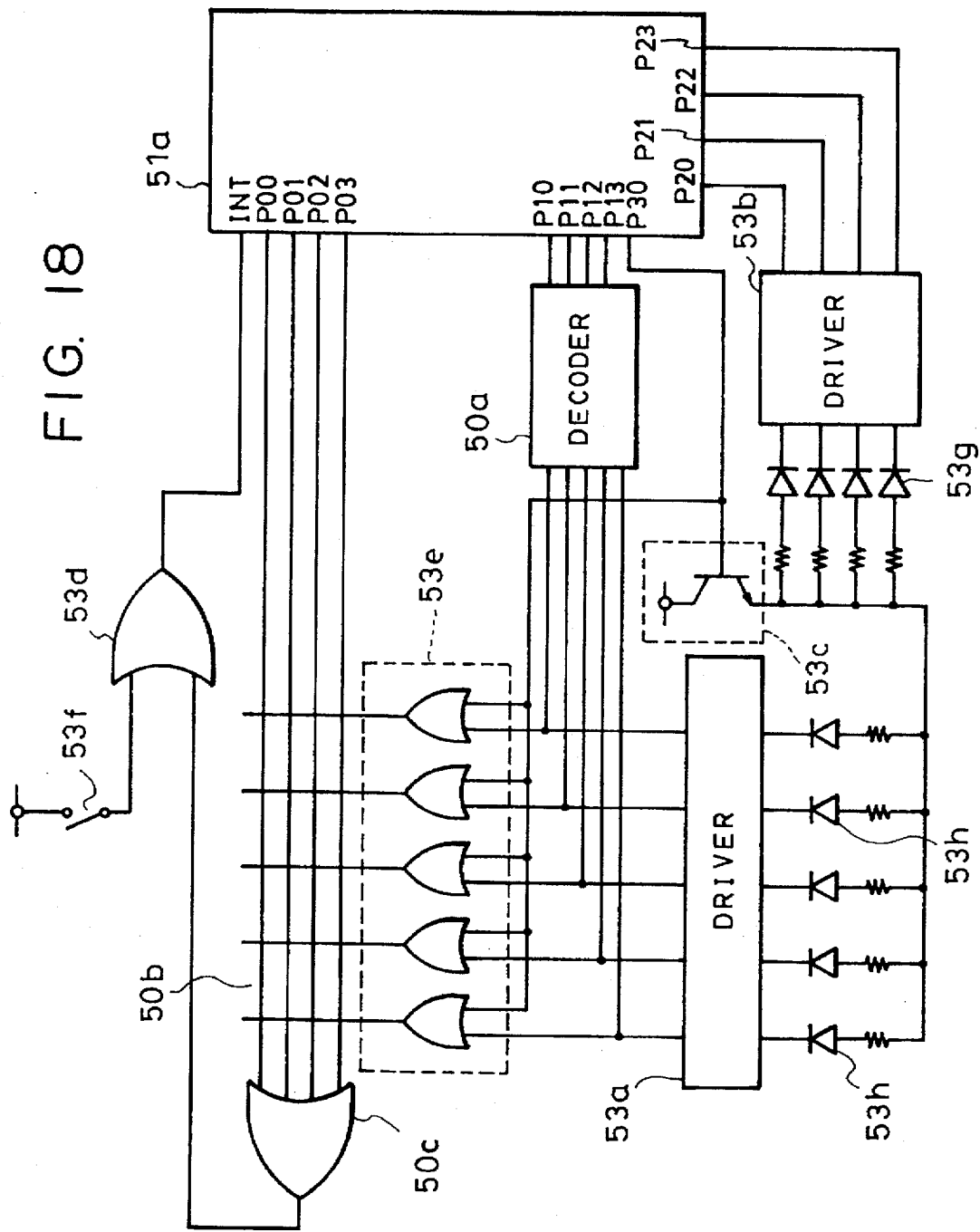
FIG. 18 is a circuit diagram which illustrates the relationship between the character input device, the control device of the apparatus according to the embodiment shown in FIG. 1.

FIG. 18 shows the relationship between the character input device 50, the control device 51 and the character position display means 53. The character position display 53 comprises a driver 53a which drives light emitting diodes (LED's) 53h, a driver 53b which drives LED's 53g, and a transistor 53c which controls switching operations for both sets of LED's 53g and 53h. The driver 53b is coupled to terminals P20–P23 of the input mode selection means 51a. The character position display means 53 further comprises an OR gate array 53e. Each OR gate of the array 53e is coupled to the driver 53a and terminal P30 of the input mode selection means 51a. The outputs of the OR gate array 53e are coupled to terminals P00-P03 and to OR gate 50c via switches 50b (not shown in FIG. 18), as shown in FIG. 16. The output of the OR gate 50c is coupled to OR gate 53d of the character position display means 53. The other input of OR gate 53d is connected to a line from a switch 53f of the character position display means 53. The output of OR gate 53d is coupled to the INT terminal of the input mode selection means 51a.

Figure 19:
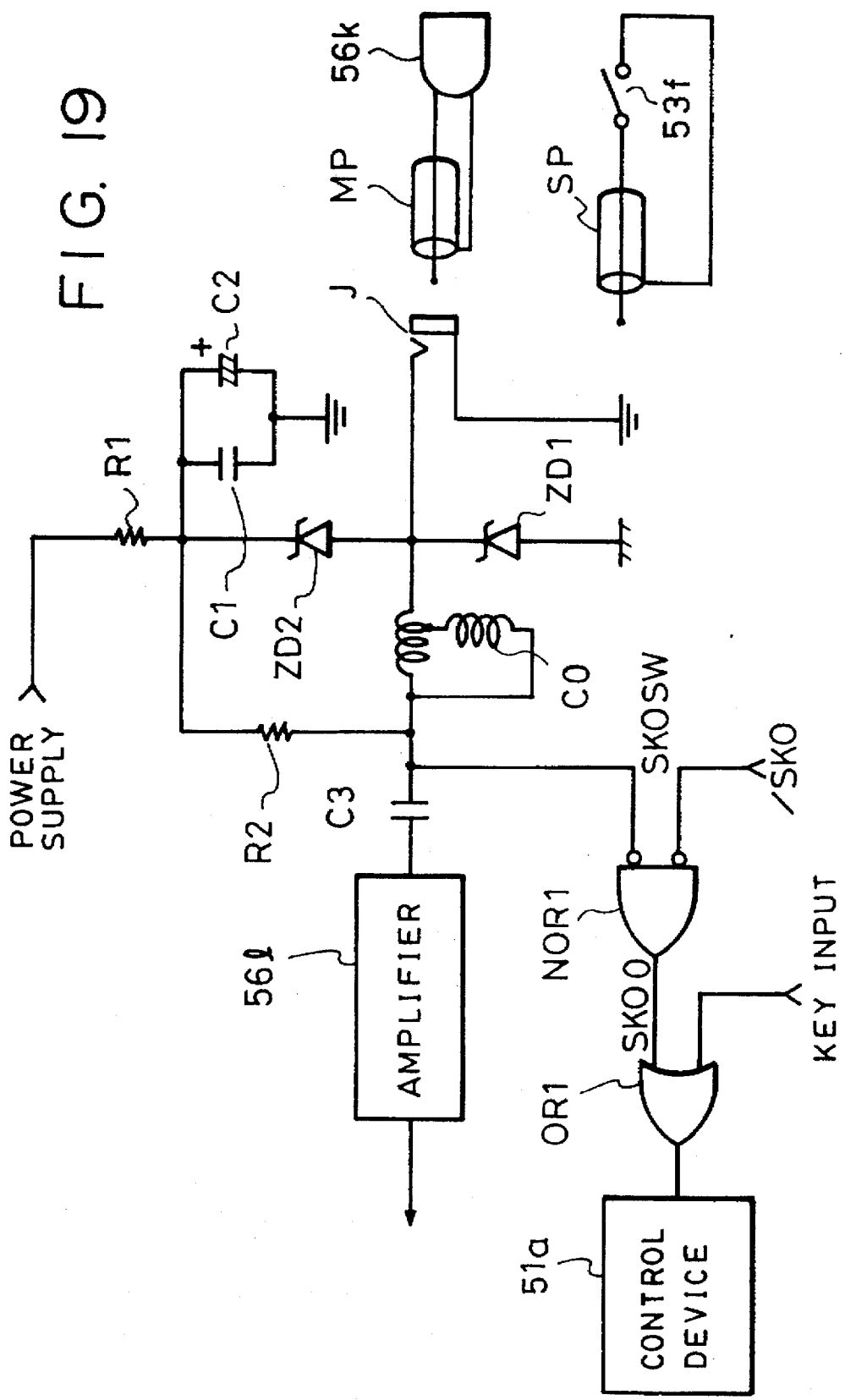
FIG. 19 is a circuit diagram which illustrates an external switch input circuit.

The external switch input circuit will now be described with reference to FIG. 19. The microphone 56k is provided for the purpose of inputting voice information to the voice input device 56b. The external switch 53f is used in the SKO mode. Referring to FIG. 19, Zener diodes ZD1, ZD2 and a choke coil CO constitute a protection circuit which is actuated if an excessively high voltage is erroneously applied to a jack J. A circuit comprising fixed resistors R1 and R2, and capacitors C1 and C2 constitutes a bias circuit for the microphone. In a case where the microphone 56k is used, a microphone plug MP of the microphone 56k is inserted into the jack J. Furthermore, a capacitor C3 is provided for the purpose of transmitting signals supplied through the microphone 56k to the input amplifier 56l so as to cut the DC level change of an SKOSW terminal.

When the aforesaid SKO mode is selected, the level of the SKO terminal of an NOR1 gate is lowered. When an external switch plug SP of the external switch 53f is inserted into the jack J, a terminal SKOSW of the NOR1 gate is connected to the power source (+5V), that is the level of the terminal SKOSW is maintained at the high level by resistors R1 and R2 when the external switch 53f is turned off. Therefore, the NOR1 gate transmits a low level output SKOO.

When the external switch 53f is switched on or closed, the level of the terminal SKOSW is lowered and the level of the output SKOO from the NOR1 gate is raised. When, the level of the output SKOO is raised, an interruption is effected on the INTP1 terminal of the control element 51a via an OR1 gate. Another terminal of the OR1 gate is connected to a key switch 50b of the keyboard by means of the KEY input. When the key switch 50b of the keyboard is depressed, the level of the aforesaid terminal is raised, so that the interruption takes place.

Figure 20:
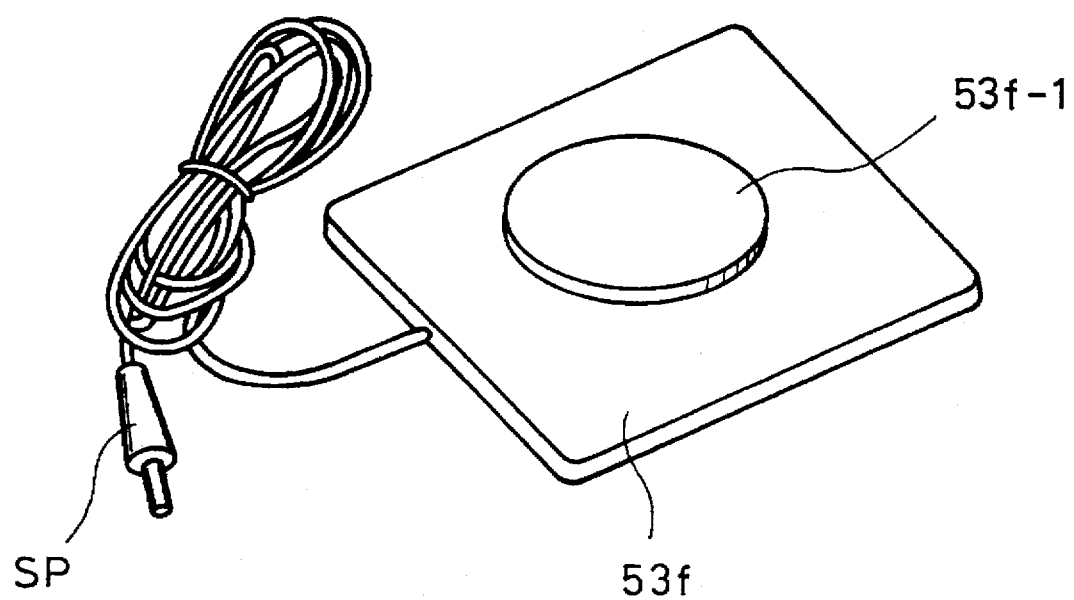
FIG. 20 illustrates the appearance of an example of the external switch.

FIG. 20 illustrates an example of the external switch. The external switch 53f has a large button 53f-1 at the central portion thereof whereby the input operation can be performed by depressing the large button 53f-1.

Then, the control device 51 will now be described.

Input data selected by a sole switch of the character input device 50 is received by the control device 51. The data received by the control device 51 is transmitted as it is to the character output device 54 except for Japanese data. The control device 51 has a Japanese word processing function performed by a Japanese word processing means 51b so that Japanese inputted as Roman characters are converted into katakana or hiragana by using the conversion table shown in FIGS. 21 to 25.

FIG. 21 illustrates clear sounds ("あ", "い", "う", ...),
FIG. 22 illustrates voiced sounds ("が", "ぎ", "ぐ", ...),
FIG. 23 illustrates p-sounds ("ぱ", "ぴ", "ぷ", ...).
FIG. 24 illustrates syllabic nasal sounds ("きゃ", "きゅ", "きょ", ...) and FIG. 25 illustrates a Roman character/ Japanese character conversion table for small characters.

Figure 26:
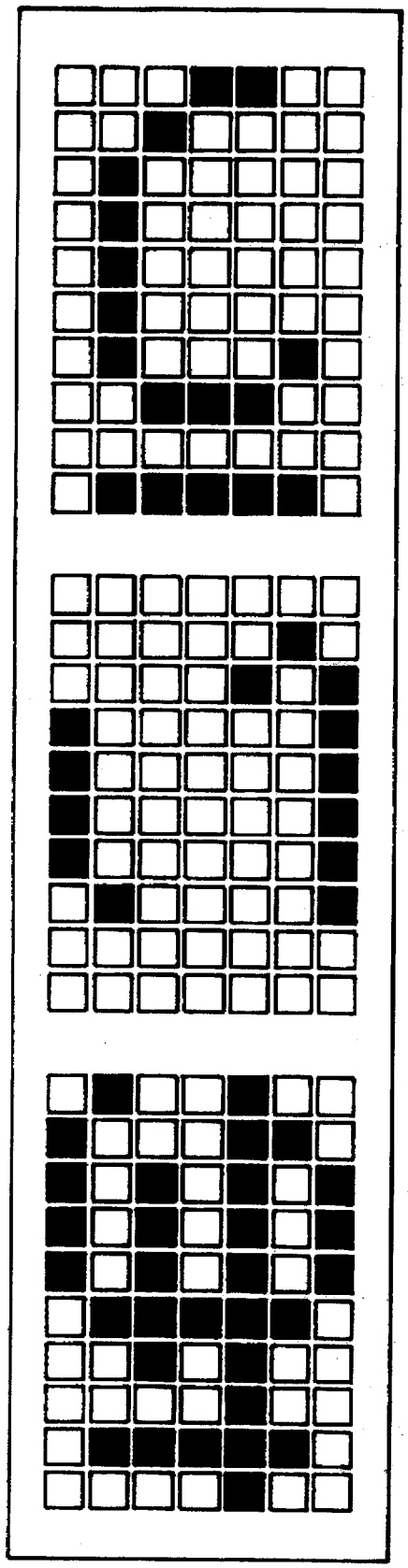
FIG. 26 illustrates an example of Japanese characters on a paper tape.
Figure 27:
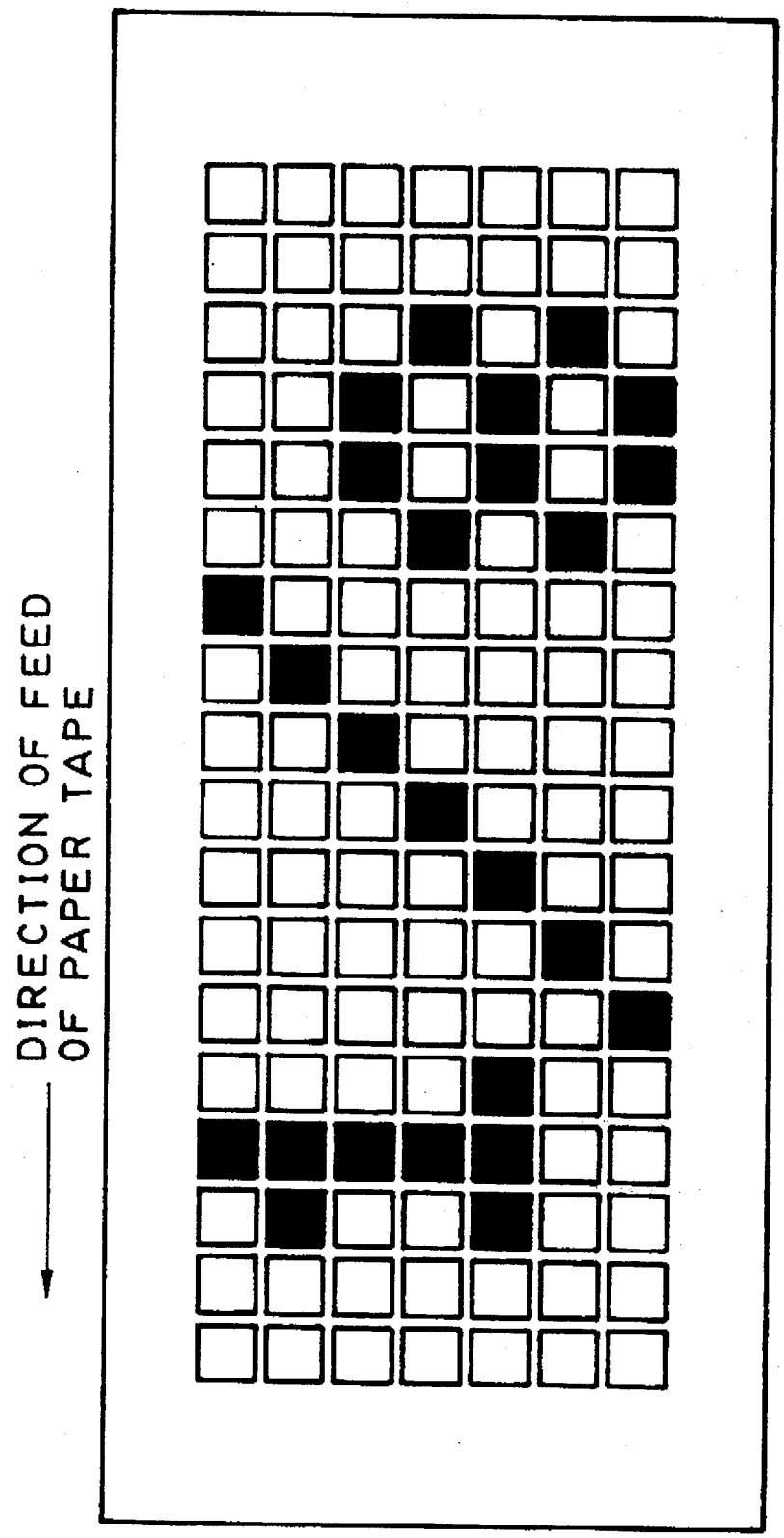
FIG. 27 illustrates an example a triple scale characters printed on a paper tape.

Furthermore, special character printing, double width character printing, vertical/horizontal writing and triple width character printing operations can be performed. The special character printing operation is an operation for printing special characters peculiar to each language by setting the language. For example, special characters such as an umlaut are inputted by two key inputs. The double width character printing operation is an operation for printing the characters by horizontally enlarging the characters by depressing the control switch (K16) and the special character (2) key switch (K25), the double width character printing operation being performed by switching the normal character printing operation. The vertical and horizontal printing operation are so performed that katakana is usually printed horizontally and hiragana is usually printed vertically. An example of the result of such printing is shown in FIG. 26, where Japanese characters (hiragana)("あ", "い", "う") are printed on a paper tape. As shown in FIG. 27, fractions (⅛, ...) are printed to have a width which is three times the width of normal characters. A summary of the character fonts is shown in FIG. 28.

The operation of the character output device 54 will now be described.

Referring to FIG. 7, when the stepping motor 54a is rotated, the rotation of the stepping motor 54a is transmitted to the rubber roller 54c via the gear train 54e. The TPH 54b has a heating member to which an electric signal is supplied from the conductor 54d for the TPH 54b. The paper tape passes between the TPH 54b and the rubber roller 54c, and therefore characters are printed on thermal sensitive paper by TPH 54b.

Figure 29:
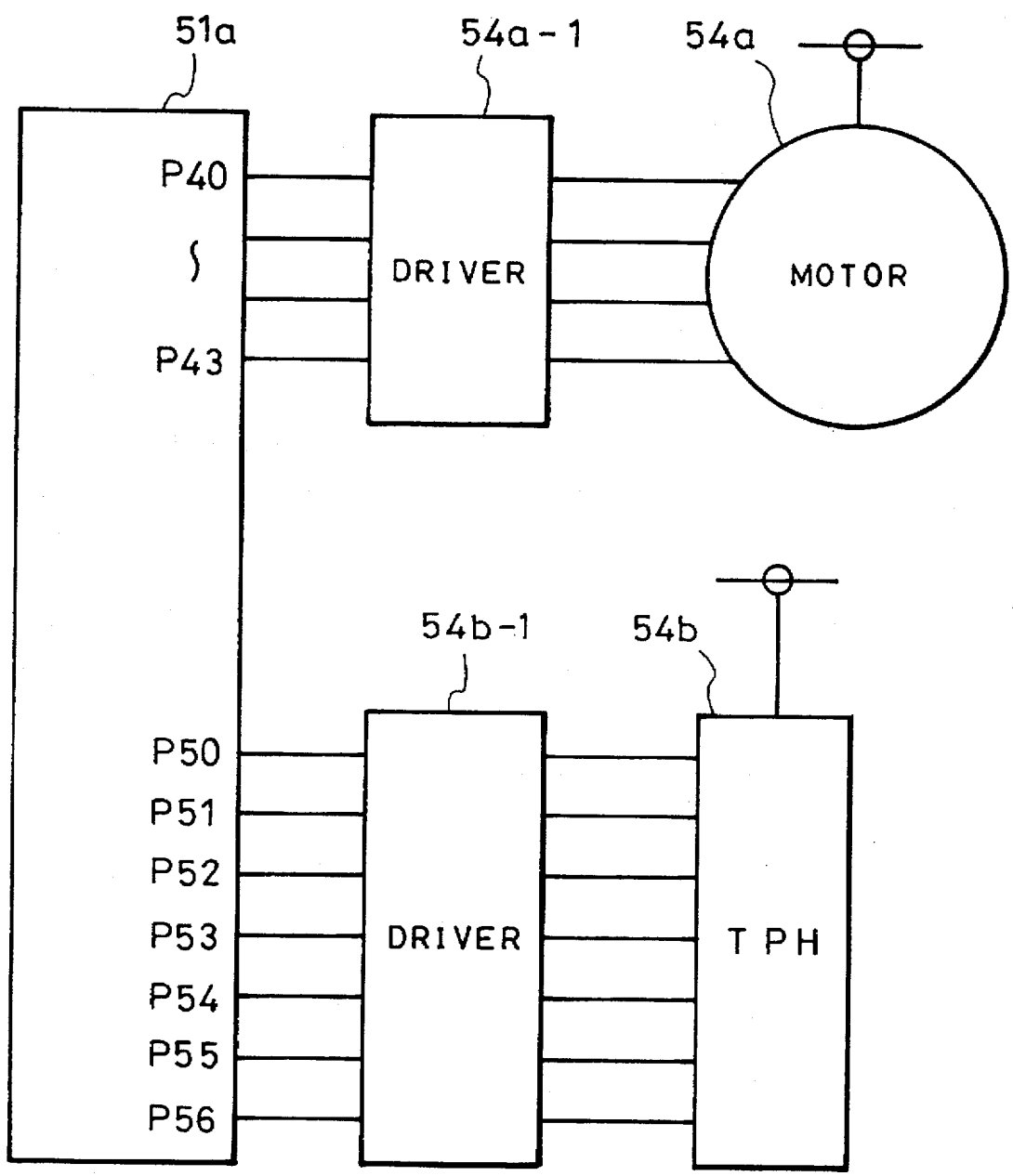
FIG. 29 is a circuit diagram which illustrates the character output device of the apparatus according to the embodiment shown in FIG. 1.
Figure 30:
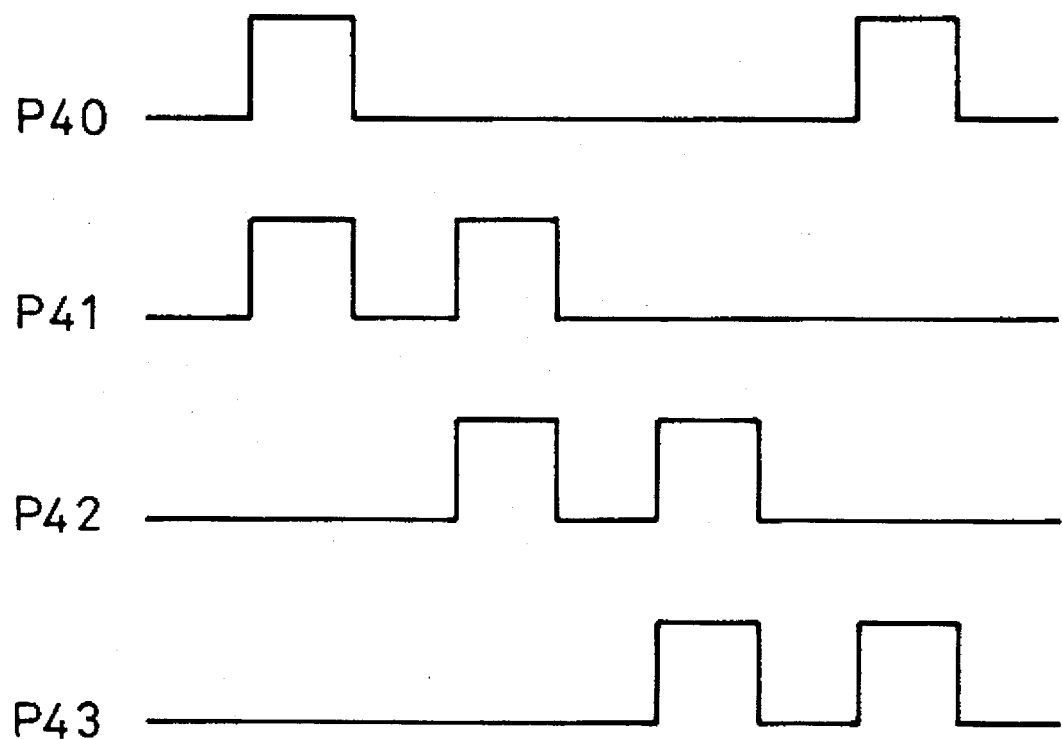
FIG. 30 is a timing chart which illustrates a motor drive of the character output device shown in FIG. 29.
Figure 31:
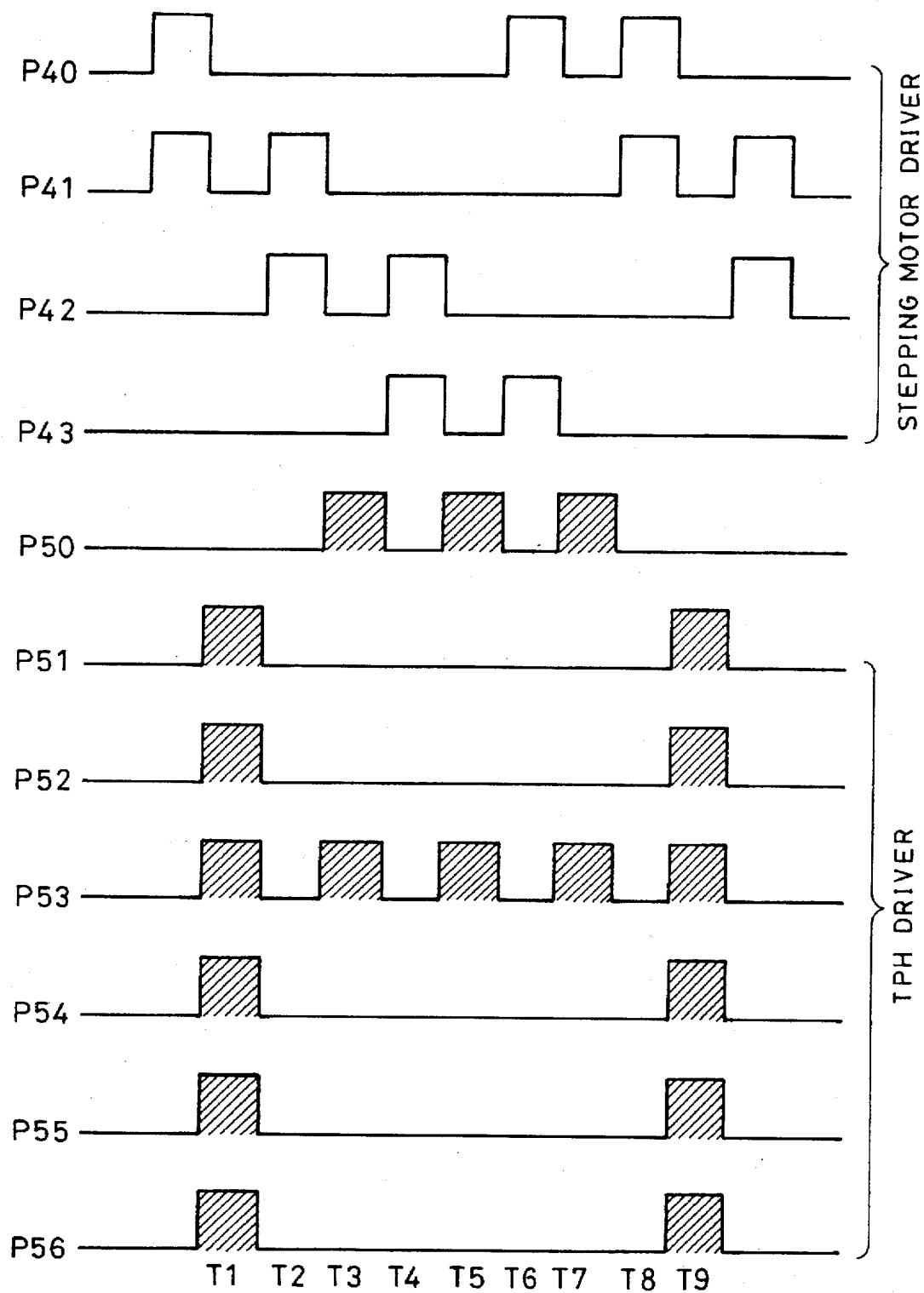
FIG. 31 is a timing chart which illustrates a motor driver and a TPH driver of the character output device shown in FIG. 29.
Figure 34:
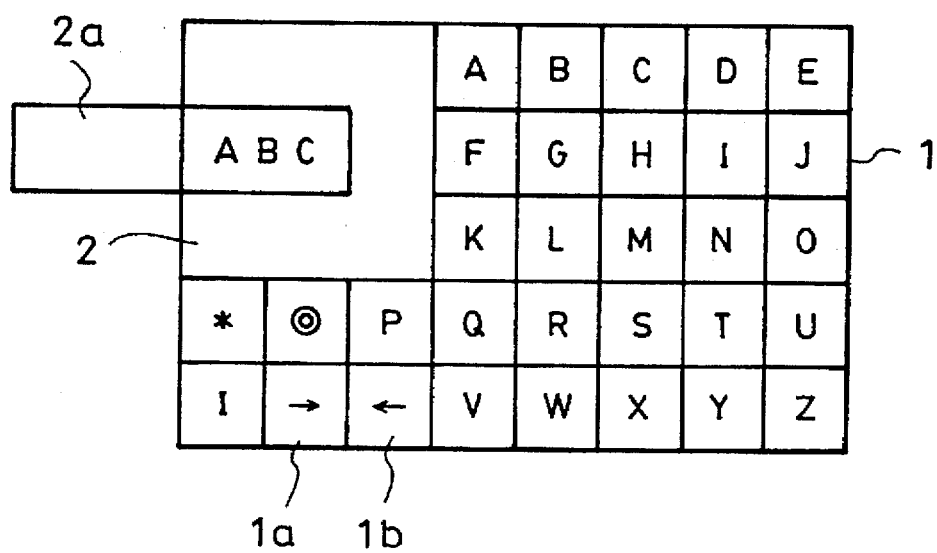
FIG. 34 illustrates the schematic appearance of a conventional communication apparatus.
Figure 35:
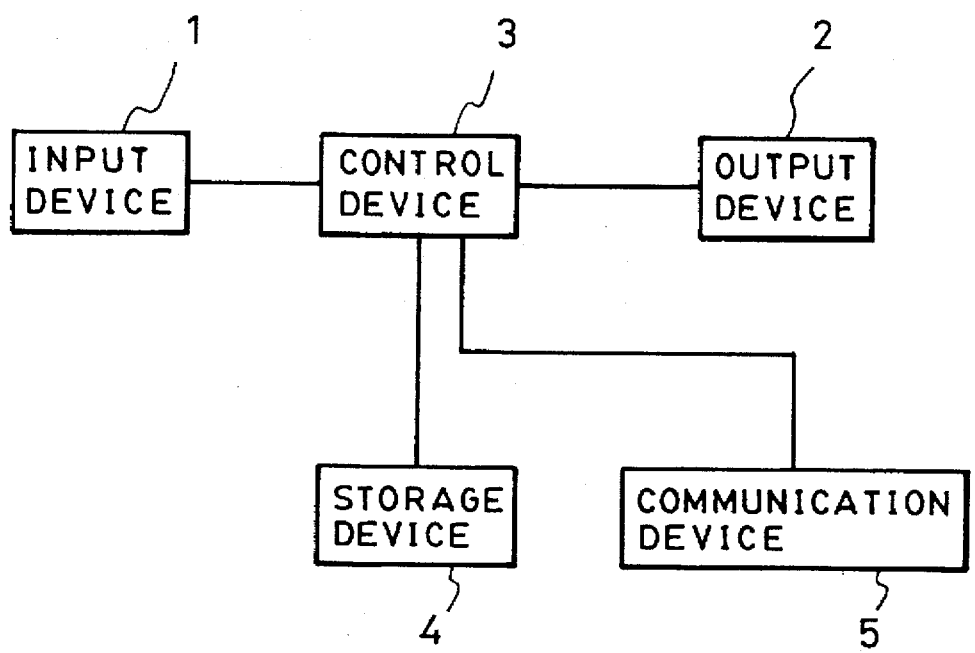
FIG. 35 is a block diagram which illustrates the structure of a conventional communication apparatus.
Figure 36:
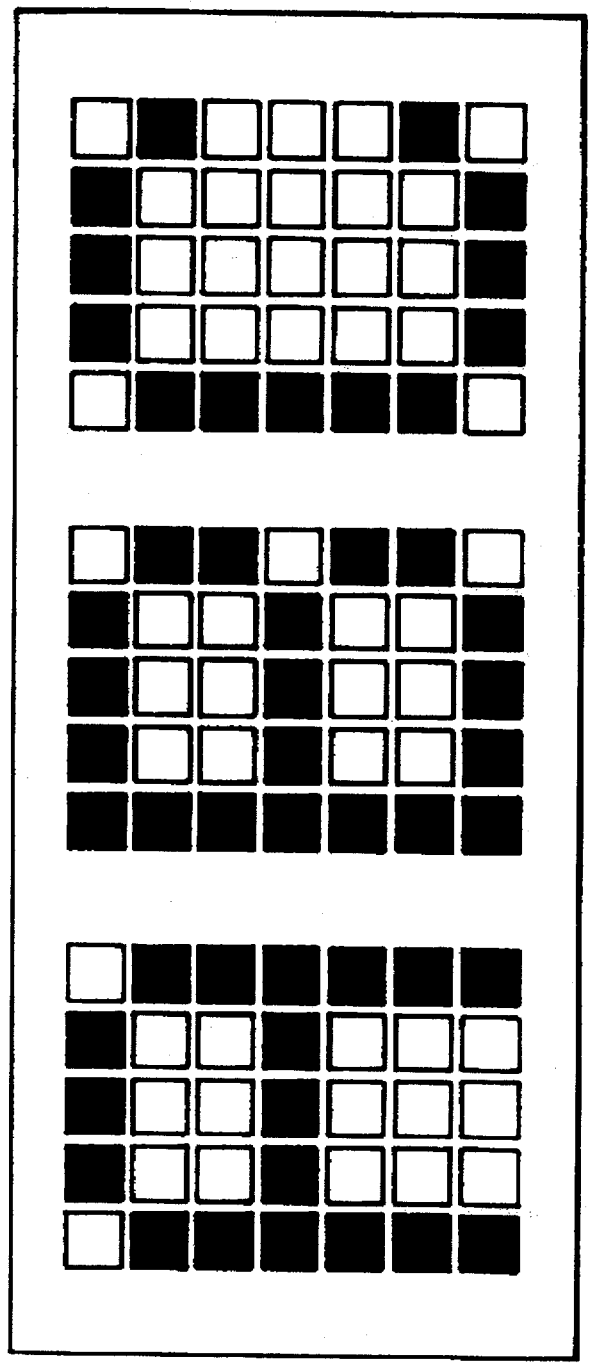
FIG. 36 illustrates an example of characters printed by the conventional communication apparatus.

Further referring to FIGS. 29 to 31, the output terminals P40 to P43 of the control element 51a are connected to the corresponding phases of the 4-phase stepping motor 54a. When pulses as shown in FIG. 30 are transmitted from terminals P40 to P43 of the control element 51a, the stepping motor 54a is rotated. Symbols P40 to P43 represent the output terminals in FIG. 29 and as well as denoting signals to be transmitted from the output terminals in FIGS. 30 and 31. Output terminals P50 to P56 are connected to heating dots of the TPH 54b via a driver 54b-1 so that the TPH 54b is heated in accordance with the outputs from the output terminals P50 to P56 and therefore characters are printed on thermal sensitive paper. By transmitting pulses to the motor and the TPH 54b in a time sequential manner, characters appear on the surface of the thermal sensitive paper. Symbols P50 to P56 denote output terminals in FIG.

Figure 37:
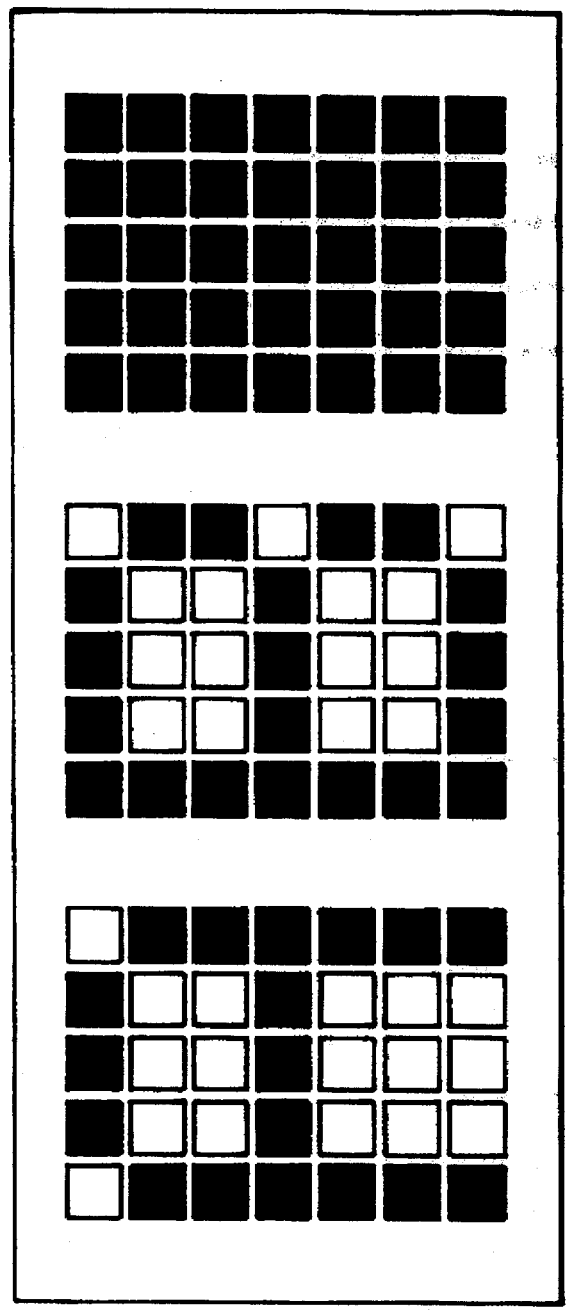
FIG. 37 illustrates another example of characters printed by the conventional communication apparatus.

29 and signals transmitted from these output terminals in FIGS. 30 and 31. FIG. 31 shows the output pulses from the terminals P40 to P43 and P50 to P57 when "A" is depressed. When a certain character is inputted from the keyboard, the control element 51a transmits a signal denoting the rotation of the motor 54a and a signal (data about the characters to be transmitted) denoting the action of the TPH 54b are transmitted in a period from time T1 to T9. The result of printing, thus performed, becomes as shown in FIG. 37 in such a manner that character "A" is printed to be formed into a character the size of which is 5×7 dots.

The character reading operation will now be described.

The number of addresses which can be inputted to the storage device 52 is, for example, 26 addresses of the character keys (A to Z), and addresses for 7000 characters can be stored by the storage device 52 (depending upon the capacity of the RAM). Each address is able to store an arbitrary number of characters. Furthermore, sentences can be added to a message, which has been already stored, and an unused address or residual characters which can be stored can be outputted from the character output device 54 by the unused output control means 51c. The character codes to be stored are made to be 00hex to 0FFhex and voice data can be specified in the message input.

Figure 9:
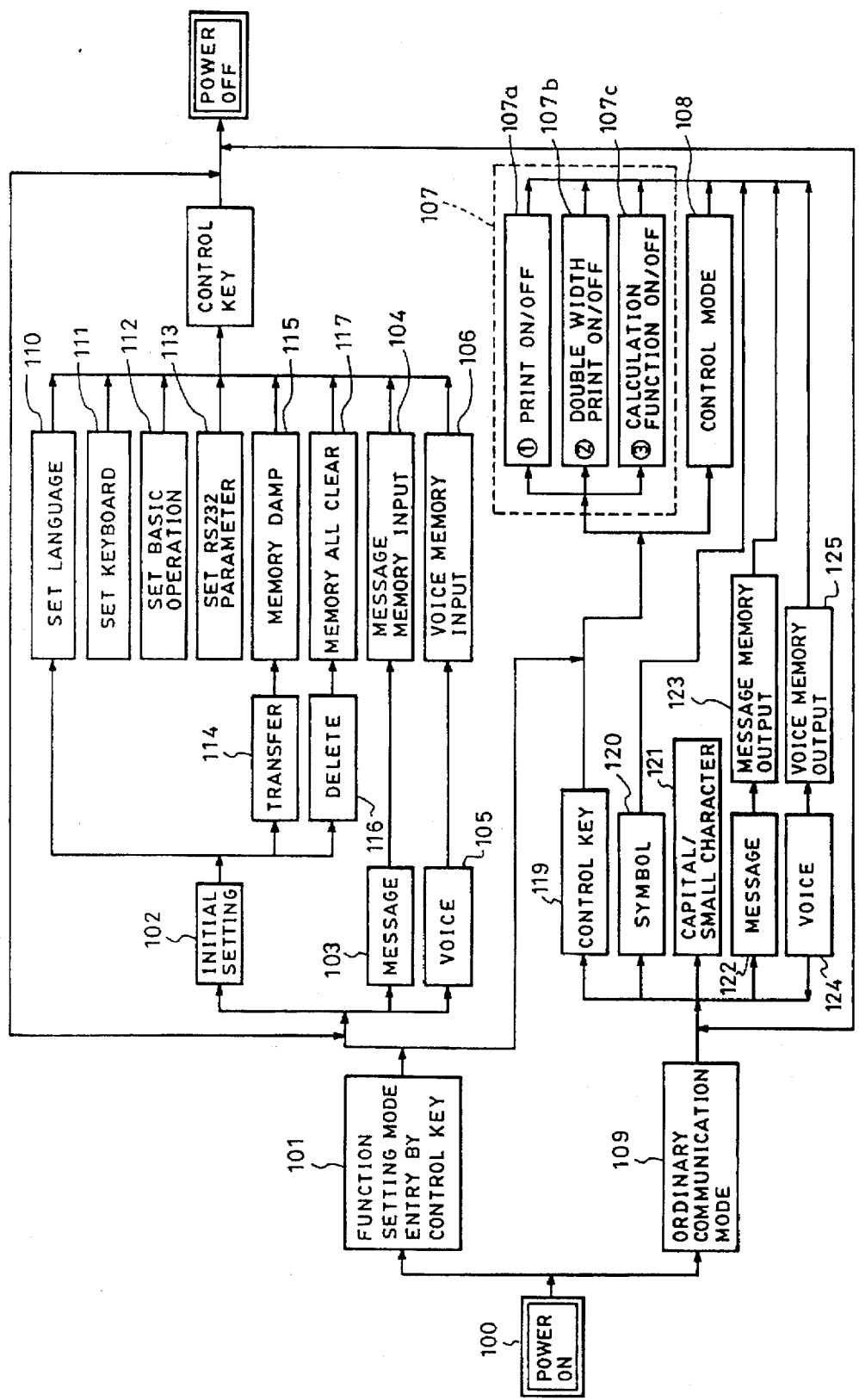
FIG. 9 is a flow chart which illustrates the operation of the apparatus according to the embodiment shown in FIG. 1.

The inputting of the sentence which is the character input data is performed by depressing the message.memory key, and specifying a message.memory input and an address in steps 103 and 104 shown in FIG. 9. Then, a message is stored at to the specified address. When the memory is filled with data, an alarm is issued. When the input is completed, the message.memory key is again depressed to escape from the aforesaid mode. It should be noted that the input can be made consecutively to another address. If the voice data is to be input, the voice memory input is specified in steps 105 and 106 to specify the address at which the voice data is to be stored.

The outputting of the sentence is performed by specifying a message.memory output in steps 122 and 123 so that the message stored in the storage device 52 is printed by the character output device 54. The aforesaid printing operation can be cancelled by depressing the space key. If the address is specified even after the printing operation has been completed, the message can be printed consecutively.

On the other hand, the communication device 55 performs as follows.

Since the communication device 55 has a serial interface conforming to RS232, mutual communication of data with a personal computer, which is the external device, is performed and as well as another communication apparatus is operated by using the external device control means 51g. The selection of the parameters (the baud rate, the data length, the stop bit, the parity and the hand shake) is performed by using the parameters shown in FIG. 32. If the baud rate or the like is not suitable, an NUL code is transmitted.

At the time of the transmission operation performed by the communication device 55, all of the characters inputted by using the keys are printed and transmitted through the RS232 interface. At this time, the address in the message calling mode is not transmitted, but only data is transmitted. By using the external apparatus control means 51g and the special character column transmitted as described above, another communication apparatus can be operated. For example, when hex (0E, 42, 0F) shown in FIG. 10 is transmitted, the buzzer of the other communication apparatus is actuated. The "hex" expresses a hexadecimal expression.

In a data receiving operation, the key input can be received even if the received data is being printed. Incidentally, the number of the receiving buffers is made to be, for example, 25. The communication apparatus according to the present invention has a memory damp function so that setting of the message.memory and all of the parameters can be transmitted to another communication apparatus. At this time, either the transmission side or the receiving side is selected, and all of the messages and all of the parameters are specified and transferred if the transmission side is selected. In the memory damp mode, the parameter of the R232 is temporarily brought to the default state. It should be noted that, a code, which is not defined in the character code table, can be expressed by connecting a plurality of character codes defined in the character code table by the code transmitting/receiving means 51f so as to transmit/receive the expressed code as communication data.

The operation of the voice device 56 will now be described.

The recording/reproducing time with the voice device 56 can be selected. In the initial setting mode, the process proceeds to a process of selecting the recording/reproducing time, and characters are inputted by using the character input device 50, so that the recording/reproducing time is selected. The relationship between the input characters, the sampling frequency, the bit rate and the recording/reproducing time of the voice device 56 is schematically shown in FIG. 33.

The voice device 56 is arranged to perform the A/D (Analog/Digital) conversion by the ADPCM method. The quantization is performed with four bits and the storage capacity is about 2 Mbits (two 1M-bit static RAMs are used). By inputting characters by using the character input device 50, the division ratio of the clock pulses to be generated by the oscillating circuit 56g of the voice control device 56a can be changed as a result of the control performed by the control device 51. If the sampling frequency is changed as a result of this and as well, if the storage capacity is the same, the storing/reproducing time is changed. Since the storage capacity of this device 56 is the same, the sound quality is improved in proportion to the sampling frequency but the recording/reproducing time is shortened. Furthermore, the address of this device 56 is specified by using any of the 26 keys from A to Z of the character input device 50 and recording/reproducing is performed for an arbitrary time in units of one second. The total sum of the time for this operation is limited to the recording/reproducing time which has been set. The addresses (the address of the static RAM) in the voice storage device 56c which corresponds to the 26 addresses from A to Z are controlled by the control device 51.

Information about the recording time for recording unused addresses and residual voice information is transmitted to the character output device 52 by the unused control means 51e.

The recording operation is performed by the voice device 56 as follows.

When the recording operation is selected by using the character input device 50 which also selects any one of the addresses from A to Z, the information about the recording operation is transmitted from the control device 51 to the voice control circuit 56j via the CPU interface circuit 56e so that the voice control device 56j is brought into the recording mode.

A voice signal inputted to the microphone 56k of the voice input device 56b is amplified by the input amplifier 56l to a required level. Then, the amplified voice signal is supplied to an input LPF 56m so that an unnecessary voice bandwidth is cut. Then, the voice signal is supplied to the A/D conversion circuit 56h so as to be A/D converted by the ADPC method. The data thus obtained is stored by the voice storage device 56c after it passes through the RAM interface circuit 56f. The addresses in the voice storage device 56c are controlled by the control device 51.

When the reproduction operation is selected by using the character input device 50, which also selects any one of the addresses from A to Z, the information of the reproduction operation is transmitted from the control device 51 to the voice control circuit 56j via the CPU interface circuit 56e so that the voice control device 56a is brought into the reproduction mode. The control device 51 transmits the addresses in the voice storage device 56c, which correspond to the addresses from A to Z supplied from the character input device 50 and which are addresses of the recorded characters at the time of the recording operation, to the voice control device 56a.

The voice control device 56a sequentially picks up data in the voice storage device 56c with the address transmitted from the control device 51 so as to convert the data into an analog voice signal by the D/A conversion circuit 56i, the analog voice signal being then transmitted to the voice output device 56d by the control device 51. The voice output device 56d cuts unnecessary bandwidth from the signal using the output LPF 56n in order to obtain a required voice signal, which has been D/A converted, and then it is sufficiently amplified by the output amplifier 56o. As a result, the speaker 56p is actuated.

The communication apparatus according to the present invention has the calculation function means 51h for addition, subtraction, multiplication and division calculations, mixed calculations, constant calculations involving a constant and the like. By setting the operation mode to the calculation function mode, the present invention can be used as a handy calculator. In this case, the keyboard is set to the decorative characters shown in FIG. 13 and the calculation function mode is selected, so that the aforesaid key arrangement is automatically set. The keys in this arrangement will now be described. The numeral keys [0, 1, 2, 3, 4, 5, 6, 7, 8, 9] of the register key are sequentially inputted starting from the highest digit. In the case where the number of the digits is larger than 8, only 8 digits are made to be effective to be involved in the designated calculation and the 9th digit and the following digits are printed but their values are ignored in performing the designated calculations. The binary point key [.] is inputted at the position of the binary point and the position which has been inputted faster is given priority. The seventh decimal place can be effective.

When four-rule calculations such as the addition, subtraction, multiplication and division calculations are performed by using the four-rule calculation keys [+, −, ×, ÷], the inputs are made at the corresponding positions in accordance with the equation to be inputted. In mixture calculations of the four rules the multiplication and the division operations are given priority over the addition and the subtraction operations. If the four-rule calculation key is depressed consecutively after the depressing of the four-rule calculation key, the previous four-rule calculation key is ignored but the new four-rule calculation command is executed. However, if the level of the previously inputted calculation command is the same or at a lower level than the latter calculation command, the calculation is executed.

An equal key [=] is used when the calculation operation is commenced after the calculation has been executed. An all-clear key [a space key] is used to clear all of the inputted data and calculation commands, thereby cancelling an erroneous state, and a space for one character is provided when the space key is depressed. A clear key [a deletion key] is used to clear an erroneously inputted number or an erroneously depressed calculation key or the like. In this case, the inputted number and the calculation are individually cleared but an erroneous operation including both of them cannot be cleared with the clear key. Furthermore, the results of the calculations are stored and only the displayed numbers are deleted. In the case where the digits of the inputted number exceed 8, only the first 8 digits of the number become effective to be involved in the inputted calculation operation and the part of the number starting from the ninth digit is ignored, although it is printed. Therefore, the part of the number after the 8th digit is actually cleared in the case where the inputted number is cleared and the result of the printing becomes different if the number is inputted again as an 8 digit number. The parenthesis keys [( )] are used to input only a negative number and are so used that, if the left or the right parenthesis is not inputted, the subject operation is treated as an error. It should be noted that the parenthesis can be cleared. However, since the space between the two parentheses is used to input the negative sign "−", the input of another calculation key or a clear operation between the two parentheses is treated as an error.

The number of the digits after the eighth digit in the number which is the result of the calculation, the located decimal point error symbol, and an error symbol are displayed if the integer portion of the result of the calculation exceeds the displayed digits. The result of the rough estimation can be obtained by multiplying the displayed digits by 108. When a division is performed while using zero as the divisor, an error symbol and 0 are displayed. If the integer portion of the result of the calculation exceeds 16 digits, the error symbol and zero are displayed. If a number exceeding 8 digits is inputted, the part exceeding 9 digits is ignored, although printing is performed. If an error is displayed, the ensuing calculation cannot be performed. In this case, the inputted numbers and calculation operations are all-cleared by using the space key. The addition, the subtraction, the multiplication and the division calculations, the decimal calculations, the constant calculation and the parenthesis calculation are performed in substantially the same manner as that employed by an ordinary calculator.

The contents of the above-mentioned embodiments are composed of at least nineteen aspects which correspond to nineteen of the objects noted above.

That is, according to a first aspect of the invention, its structure is arranged in such a manner that an input mode selection means is provided which selects either a general input mode in which character input data is inputted by a plurality of the key switches of a character input/output apparatus or a single key input mode in which the character input data is inputted by a single key switch. Therefore, the input of the character input data can be performed by using the single key switch such as the external switch, as well as by using a plurality of the key switches on, for example, the keyboard. As a result, a handicapped person suffering from progressive muscular atrophy, is able to select either of the two modes, depending upon the severity of his condition at a given time, thereby permitting such a person to be able to use the apparatus for a long time.

According to a second aspect of the invention, its structure is arranged in such a manner that the character input/output device comprises a character input device for inputting the character input data in the general input mode or the single key input mode and a character output device for outputting at least the character output data which corresponds to the character input data. Therefore, character output data corresponding to character input data can be properly outputted to, for example, the surface of a paper tape.

According to a third aspect of the invention, the structure according to the first or the second aspect is arranged in such a manner that Japanese word processing means is provided which outputs the character input data in the form of hiragana or katakana as the character output data in the case where the character input data inputted in the general input mode or in the single key input mode is Japanese. Therefore, even if the character input data is Japanese in a Roman character form, it can be converted into hiragana or katakana so that the process can be performed in Japanese.

According to a fourth aspect of the invention, the structure according to the first aspect is arranged in such a manner that character information reproducing means is provided which reproduces the character information, which corresponds to a predetermined address, as the character output data, so as to be outputted from the character input/output device. Therefore, character information, which has been stored at a predetermined address by, for example, a key inputting operation, can be reproduced as the character output data so as to be outputted from the character input/output device.

According to a fifth aspect of the invention, the structure according to the first aspect is arranged in such a manner that a control device is provided with key arrangement selection means for selecting the key arrangement of a plurality of the key switches from a group consisting of first and the second key arrangements. Therefore, the handling facility of the apparatus can be improved because either of the first or the second key arrangement suitable for the state of the use of the apparatus can be selected.

According to a sixth aspect of the invention, the structure according to the first aspect is arranged in such a manner that a character information storage device is provided which stores the character input data while making it correspond to the address, and a control portion is provided with unused output control means for causing unused addresses among the addresses and the residual number of the characters of the character input data, which can be stored, to be outputted from the character input/output device. Therefore, unused addresses and the residual number of the characters which can be stored can be outputted to the operator and facility in the operation of inputting the character input data can be improved.

According to a seventh aspect of the invention, the character output device according to the second aspect is so constituted that the character output data is outputted as a first language group in a first direction as first and the second dot configurations and a second language is outputted in a second direction while being formed into a third dot configuration. Therefore, character output data can be outputted in the form of the first or the second language and therefore the character output data can be easily discriminated.

According to an eighth aspect of the invention, the structure of the present invention is arranged in such a manner that the first language group according to the seventh aspect is composed of English, a North European or Western European language, Spanish, German, French and katakana of Japanese and the second language group is composed of hiragana of Japanese. Therefore, character output data can be outputted while making use of the characteristics of each language and the character output data can be easily discriminated.

According to a ninth aspect of the invention, the structure of the present invention is arranged in such a manner that the first, the second and the third dot configurations according to the seventh and the eighth aspects are made to be (5×7), (15×7) and (10×7), respectively. Therefore, character output data can be outputted easily and properly and in addition to which the characteristics of the first and the second language groups and the character output data can be easily discriminated.

According to a tenth aspect of the invention, the structure of the present invention is arranged in such a manner that the first and the second directions according to the seventh, the eighth and the ninth aspects are directions which are different from each other by 90° or an odd number times 90°. Therefore, character output data can be outputted in a direction which is suitable for the form of the first language group or the second language group and the character output data can be easily discriminated.

According to an eleventh aspect of the invention, the structure of the present invention according to the first aspect is arranged in such a manner that a voice device is so controlled by a control device that it reproduces and outputs voice information, which corresponds to a predetermined address. Therefore, a voice output can be obtained in addition to the character output device which prints information on the paper tape, enabling communication with an illiterate to be made.

According to a twelfth aspect of the invention, the structure of the present invention is arranged in such a manner that the voice device according to the eleventh aspect comprises a voice input device for inputting voice information, a voice storage device for storing the inputted voice information while making the voice information correspond to an address, a voice output device for outputting the voice information stored by the voice storage device at the time of reproducing the voice information, and a voice control device for controlling the storage/reproduction of the voice information. Therefore, a voice output can be made in a similar manner to the eleventh aspect of the invention.

According to a thirteenth aspect of the invention, the structure according to the twelfth aspect is arranged in such a manner that a control portion is provided with an unused control means for causing the unused addresses of all of the addresses and the residual time in which the voice information can be recorded to be outputted from the character input/output device. Therefore, the unused addresses and the residual recording time can be outputted to the operator and the operation facility in inputting the voice information can be improved.

According to a fourteenth aspect of the invention, the structure according to the fourth or the twelfth aspect is arranged in such a manner that a character information reproducing means reproduces character information and the voice information in a predetermined sequential order so that they are respectively transmitted from a character input/output device and a voice output device. Therefore, a communication can be transmitted in a further reliable manner using both the character information and the voice information and the communication can be transmitted at a high speed.

According to a fifteenth aspect of the invention, the structure according to the first aspect is arranged in such a manner that a communication device controlled by a control device and capable of communicating communication data including character input data to an external apparatus is provided. Therefore, data in, for example, another communication apparatus can be transmitted from a character input/output device and the facility in using the apparatus can be further improved.

According to a sixteenth aspect of the invention, the structure of the present invention according to the fifteenth aspect is arranged in such a manner that code transmitting/receiving means is provided which expresses a code, which is not defined by a character code table, by connecting a plurality of character codes defined by a character code table so as to transmit the code as communication data. Therefore, the storage region of the character code table can be minimized and the size of the apparatus can be decreased to a degree corresponding to the minimized region.

According to a seventeenth aspect of the invention, the structure of the present invention is arranged in such a manner that the communication data according to the fifteenth or the sixteenth aspect is made to be the character input data and an operation parameter. Therefore, a process of a type in which data in another communication apparatus or data in a personal computer or the like is used, can be performed.

According to an eighteenth aspect of the invention, the structure of the present invention according to the fifteenth aspect is arranged in such a manner external apparatus control means is provided which controls the external apparatus via the communication device. Therefore, the operation of, for example, another communication apparatus can be controlled and a network composed of a plurality of communication apparatus can be created.

According to a nineteenth aspect of the invention, the structure according to the first aspect is arranged in such a manner that calculation function means is provided which performs a predetermined calculation process in accordance with character input data in a calculation function mode and which causes a character input/output device to output the result of the calculation. Therefore, the communication apparatus according to the present invention can also be used as a desktop calculator and the facility in the operation can be improved.

Although the invention has been described in its preferred form with a certain degree of particularly, it is understood that the present disclosure of the preferred form can be changed in the details of construction and the combination and arrangement of parts may be changed without departing from the spirit and the scope of the invention as hereinafter claimed.

The individual components represented by the blocks shown in FIGS. 1, 8, 16, 18, 19 an 29 are well known in the communication apparatus art and their specific construction and operation is not critical to the invention or the best mode for carrying out the invention. Moreover, the steps recited in the specification and shown in FIG. 9 can be easily programmed to well-known central processing units by persons of ordinary skill in the art, and since such programming per se is not part of the invention, no further description thereof is deemed necessary.

What is claimed is:

1. A communication apparatus, comprising:
a plurality of key switches arranged in columns and lines for inputting character data;
a plurality of light sources arranged in columns and lines corresponding to the columns and lines of said plurality of key switches;
a circuit sequentially illuminating said plurality of light sources;
wherein the depressing of any of said plurality of key switches selects a line whose light source is lit and a column whose light source is lit to enable a key input in a first key input mode,
wherein one light source in a column and one light source in a line are adapted to be lit simultaneously to denote a depressed key in the first key input mode,
wherein the depressing of a particular key switch of said plurality of key switches inputs character data of said particular key switch in a second key input mode;
a control element selecting one of the first key input mode and the second input mode;
a character output device outputting at least character data which corresponds to the character data inputted by said plurality of key switches; and
a control device controlling the operation of said character output device, and said circuit.

2. A communication apparatus according to claim 1, further comprising a Japanese word processor converting Japanese into hiragana or katakana and controlling said character output device so as to output hiragana or katakana as the character data when the character data inputted is Japanese.

3. A communication apparatus, comprising:
a plurality of key switches arranged in columns and lines for inputting character data;
a plurality of light sources arranged in columns and lines corresponding to the columns and lines of said plurality of key switches;
a circuit sequentially illuminating said plurality of light sources;
wherein the depressing of any of said plurality of key switches selects a line whose light source is lit and a column whose light source is lit to enable a key input in a first key input mode,
wherein one light source in a column and one light source in a line are adapted to be lit simultaneously to denote a depressed key in the first key input mode,
wherein the depressing of a particular key switch of said plurality of key switches inputs character data of said particular key switch in a second key input mode;
a control element selecting one of the first key input mode and the second key input mode;
a character output device outputting at least character data which corresponds to the character data inputted by the plurality of key switches;
a character information storage device storing the inputted character data as character information at a predetermined address;
wherein said character output device causes the character information stored by said character information storage device to be output in order to reproduce the character information as the character data; and
a control device controlling the operations of said character output device, said character information storage device, and said circuit.

4. A communication apparatus, comprising:
a plurality of key switches arranged in columns and lines for inputting character data;
a plurality of light sources arranged in columns and lines corresponding to the columns and lines of said plurality of key switches;
a circuit sequentially illuminating said plurality of light sources;
wherein the depressing of any of said plurality of key switches selects a line whose light source is lit and a column whose light source is lit to enable a key input in a first key input mode, wherein one light source in a column and one light source in a line are adapted to be lit simultaneously to denote a depressed key in the first key input mode, wherein the depressing of a particular key input switch of said plurality of key switches inputs character data of said particular key switch in a second key input mode;

a control element selecting one of the first key input mode and the second key input mode;

a character output device outputting at least character data which corresponds to the character data inputted by said plurality of key switches;

a key arrangement selector selecting a key arrangement from a variety of key arrangements provided for said plurality of key switches; and a control device comprising said key arrangement selector, and controlling said character output device, said key arrangement selector, and said circuit.

5. A communication apparatus, comprising:

a plurality of key switches arranged in columns and lines for inputting character data;

a plurality of light sources arranged in columns and lines corresponding to the columns and lines of said plurality of key switches;

a circuit sequentially illuminating said plurality of light sources;

wherein the depressing of any of said plurality of key switches selects a line whose light source is lit and a column whose light source is lit to enable a key input in a first key input mode;

wherein one light source in a column and one light source in a line are adapted to be lit simultaneously to denote a depressed key in the first key input mode, wherein the depressing of a particular key switch of said plurality of key switches inputs character data of said particular key switch in a second key input mode;

a control element selecting one of the first key input mode and the second key input mode;

a character output device outputting at least character data which corresponds to the character data inputted by said plurality of key switches;

a character information storage device storing the inputted character data as character information at a predetermined address;

an unused output control device causing unused addresses of said character information storage device at which character data is not stored and a residual number of characters of the character data which can be stored by said character information storage device to be outputted from said character output device; and a control device, comprising said unused output control device, for controlling the operations of said character output device, said unused output control device, and said circuit.

6. A communication apparatus, comprising:

a plurality of key switches arranged in columns and lines for inputting character data;

a plurality of light sources arranged in columns and lines corresponding to the columns and lines of said plurality of key switches;

a circuit sequentially illuminating said plurality of light sources;

wherein the depressing of any of said plurality of key switches selects a line whose light source is lit and a column whose light source is lit to enable a key input in a first key input mode;

wherein one light source in a column and one light source in a line are adapted to be lit simultaneously to denote a depressed key in the first key input mode, wherein the depressing of a particular key switch of said plurality of key switches inputs character data of said particular key switch in a second key input mode;

a control element selecting one of the first key input mode and the second key input mode;

a character output device for outputting at least character data, which corresponds to the character data inputted by said plurality of key switches, in such a manner that a first language group is outputted in a first direction while being formed into a first and a second dot configuration and a second language group is outputted in a second direction while being formed into a third dot configuration; and a control device controlling the operations of said character output device, and said circuit.

7. A communication apparatus according to claim 6, wherein the first language group is composed of English, a North European language, Spanish, German, French and Katakana of Japanese and the second language group is composed of hiragana of Japanese.

8. A communication apparatus according to claim 6, wherein the first, second and third dot configurations, respectively, are formed into configurations (5×7), and (15× 7) and (10×7).

9. A communication apparatus according to claim 8, wherein the first language group is composed of English, a western European language, Spanish, German, French and Katakana of Japanese and the second language group is composed of hiragana of Japanese.

10. A communication apparatus according to claim 6, wherein the first and second directions are different from each other by 90° or an odd number times 90°.

11. A communication apparatus according to claim 10, wherein the first language group is composed of English, a western European language, Spanish, German, French and Katakana of Japanese and the second language group is composed of hiragana of Japanese.

12. A communication apparatus, comprising:

a plurality of key switches arranged in columns and lines for inputting character data;

a plurality of light sources arranged in columns and lines corresponding to the columns and lines of said plurality of key switches;

a circuit sequentially illuminating said plurality of light sources;

wherein the depressing of any of said plurality of key switches selects a line whose light source is lit and a column whose light source is lit to enable a key input in a first key input mode, wherein one light source in a column and one light source in a line are adapted to be lit simultaneously to denote a depressed key in the first key input mode, wherein the depressing of a particular key switch of said plurality of key switches inputs character data of said particular key switch in a second key input mode;

a control element selecting one of the first key input mode and the second key input mode;

a voice input device inputting voice information;

a voice storage device storing the voice information inputted by said voice input device as character information at a predetermined address;

a voice output device outputting the voice information stored in said voice storage device at the time of reproducing the voice information;

a voice control device controlling recording and/or reproducing of the voice information; and a control device controlling the operations of said voice input device, said voice storage device, said voice output device, said voice control device, and said circuit.

13. A communication apparatus according to claim 12, further comprising a character output device for outputting the character output data, which corresponds to the character input data inputted by said plurality of key switches.

14. A communication apparatus according to claim 13, further comprising an unused control device causing unused addressed of said voice storage device and a residual time for recording the voice information to be outputted from said character device, wherein said control device controls aid unused control device.

15. A communication apparatus, comprising:

a plurality of key switches arranged in columns and lines for inputting character data;

a plurality of light sources arranged in columns and lines corresponding to the columns and lines of said plurality of key switches;

a circuit sequentially illuminating said plurality of light sources;

wherein the depressing of any of said plurality of key switches selects a line whose light source is lit and a column whose light source is lit to enable a key input in a first key input mode;

wherein one light source in a column and one light source in a line are adapted to be lit simultaneously to denote a depressed key in the first key input mode, wherein the depressing of a particular key switch of said plurality of key switches inputs character data of said particular key switch in a general input mode;

a control element selecting one of the first key input mode and the second key input mode;

a character output device outputting at least character data which corresponds to the character data inputted by said plurality of key switches;

a character information storage device for storing the character data inputted by said plurality of key switches as character information at a predetermined address;

a character information reproducing device causing the character information stored by said character information storage device to be outputted from said character output device in order to reproduce the character information as said character output data;

a voice input device for inputting voice information;

a voice storage device for storing the voice information inputted by said voice input device at a predetermined address;

a voice output device for outputting the voice information storage by said voice storage device at the time of reproducing the voice information; and a control device for controlling said character information reproducing device, said character information storage device, and said voice storage device in such a manner that the predetermined address of the character information and the voice information is specified so as to permit said character information reproducing device to cause the character information stored by said character information storage device to be outputted from said character output device and so as to cause said voice output device to output the voice information stored by said voice storage device so as to reproduce the character information and the voice information in a predetermined sequential order.

16. A communication apparatus, comprising:

a plurality of key switches arranged in columns and lines for inputting character data;

a plurality of light sources arranged in columns and lines corresponding to the columns and lines of said plurality of key switches;

a circuit sequentially illuminating said plurality of light sources;

wherein the depressing of any of said plurality of key switches selects a line whose light source is lit and a column whose light source is lit to enable a key input in a first key input mode;

wherein one light source in a column and one light source in a line are adapted to be lit simultaneously to denote a depressed key in the first key input mode, wherein the depressing of a particular key switch of said plurality of key switches inputs character data of said particular key switch in response to depressing said particular key switch in a second key input mode;

a control element selecting one of the sole key input mode and the general input mode;

a character output device outputting at least character output data which corresponds to the character input data inputted by said plurality of key switches;

a control device controlling the operations of said character output device and said circuit; and a communication device, controlled by said control device, for communicating communication data, including the character input data, with an external apparatus.

17. A communication apparatus according to claim 16, further comprising a code transmitter/receiver generating a code which is not defined by a character code table by connecting a plurality of character codes defined by a character code table and causing the code to be transmitted/received as the communication data.

18. A communication apparatus according to claim 17, wherein the communication data is composed of the character input data and an operation parameter.

19. A communication apparatus, according to claim 16, wherein the communication data is composed of the character input data and an operation parameter.

20. A communication apparatus according to claim 16, further comprising an external apparatus control device controlling the external apparatus via said communication device.

21. A communication apparatus, comprising:

a plurality of key switches arranged in columns and lines for inputting character data;

a plurality of light sources arranged in columns and lines corresponding to the columns and lines of said plurality of key switches;

a circuit sequentially illuminating said plurality of light sources;

wherein the depressing of any of said plurality of key switches selects a line whose light source is lit and a column whose light source is lit to enable a key input in a first key input mode, wherein one light source in a column and one light source in a line are adapted to be lit simultaneously to denote a depressed key in the first key input mode, wherein the depressing of a particular key switch of said plurality of key switches inputs character data of said particular key switch in response to depressing said particular key switch in a second key input mode;

a control element selecting one of the first key input mode and the second key input mode;

a character output device outputting at least character data which corresponds to the character data inputted by said plurality of key switches;

a calculator performing a predetermined calculation process in accordance with the character data when a calculation function mode is selected and causing the result of the calculation process to be outputted by said character output device; and a control device for controlling the operations of said character output device, said calculator, and said circuit.

22. A communication apparatus comprising:

a plurality of key switches arranged in columns and lines for inputting character data;

a plurality of light sources arranged in columns and lines corresponding to the columns and lines of said plurality of key switches;

a circuit sequentially illuminating said plurality of light sources;

wherein the depressing of any of said plurality of key switches selects a line whose light source is lit and a column whose light source is lit to enable a key input in a first key input mode, wherein one light source in a column and one light source in a line are adapted to be lit simultaneously to denote a depressed key, in a first key mode, wherein the depressing of a particular key switch of said plurality of key switches inputs the character data of said particular key switch in response to depressing said particular key switch in a second key input mode;

a control element selecting one of the first key input mode and the second key input mode, wherein said control element selectively changes the number of key switches that can be depressed to input desired character data of a single key switch by a handicapped user to match the severity of the user's handicap;

a character output device for outputting at least character data which corresponds to the character data inputted by said plurality of key switches; and a control device for controlling the operation of said character output device, and said circuit.

* * * * *

UNITED STATES PATENT AND TRADEMARK OFFICE
CERTIFICATE OF CORRECTION

PATENT NO. : 5,680,158  
DATED : October 21, 1997  
INVENTOR(S) : Masaaki YOSHIDA et al.

Page 1 of 3

It is certified that error appears in the above-identified patent and that said Letters Patent is hereby corrected as shown below:

ON THE COVER PAGE

Item [56] References Cited:

Insert:

```
--4,558,315    12/1985    Weiss et al.
  3,651,512    03/1972    Summers
  4,915,632    04/1990    Leff et al.
  4,713,535    12/1987    Rhoades
  4,293,855    10/1981    Perkins
  3,818,448    06/1974    Wilkins
  4,241,521    12/1980    Dufresne
  4,658,374    04/1987    Tanimoto et al.
  5,113,481    05/1992    Smallwood et al.
  4,748,589    05/1988    Kanou et al.
  5,063,534    11/1991    Kishimoto--.
```

Column 7:

Line 47, delete "be".
Line 62, "cross sectional" should read --cross-sectional--.
Line 65, "cross sectional" should read --cross-sectional--.

Column 9

Line 31, "cross sectional" should read --cross-sectional--.
Line 33, "cross sectional" should read --cross-sectional--.

UNITED STATES PATENT AND TRADEMARK OFFICE
CERTIFICATE OF CORRECTION

PATENT NO. : 5,680,158
DATED : October 21, 1997
INVENTOR(S) : Masaaki YOSHIDA et al.

It is certified that error appears in the above-identified patent and that said Letters Patent is hereby corrected as shown below:

Column 10

Line 39, "561" should read --56$\ell$--.
　　　Line 42, "561" should read --56$\ell$--.
　　　Line 54, "flow chart" should read --flowchart--.

Column 12

Line 2, "key." should read --key,--.
　　　Line 4, "an" should read --a--.

Column 13

Line 44, "561" should read --56$\ell$--.

Column 15

Line 28, "to" should be deleted.

UNITED STATES PATENT AND TRADEMARK OFFICE
CERTIFICATE OF CORRECTION

PATENT NO. : 5,680,158
DATED : October 21, 1997
INVENTOR(S) : Masaaki YOSHIDA et al.

It is certified that error appears in the above-identified patent and that said Letters Patent is hereby corrected as shown below:

<u>Column 21</u>

Line 23, "manner" should read --manner that--.

<u>Column 25</u>

Line 19, "addressed" should read --addresses--.
    Line 21, "aid" should read --said--.

Signed and Sealed this

Twenty-first Day of July, 1998

Attest:

BRUCE LEHMAN

Attesting Officer     Commissioner of Patents and Trademarks